(12) United States Patent
Yang et al.

(10) Patent No.: US 8,768,087 B2
(45) Date of Patent: Jul. 1, 2014

(54) METHOD, SYSTEM AND COMPUTER PROGRAM PRODUCT FOR OPTIMIZATION OF DATA COMPRESSION WITH ITERATIVE COST FUNCTION

(71) Applicant: Slipstream Data Inc., Waterloo (CA)

(72) Inventors: En-hui Yang, Petersburg (CA); Longji Wang, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/950,326

(22) Filed: Jul. 25, 2013

(65) Prior Publication Data

US 2013/0336595 A1 Dec. 19, 2013

Related U.S. Application Data

(62) Division of application No. 13/473,738, filed on May 17, 2012, now Pat. No. 8,509,557, which is a division of application No. 12/491,764, filed on Jun. 25, 2009, now Pat. No. 8,194,990, which is a division of application No. 10/924,189, filed on Aug. 24, 2004, now Pat. No. 7,570,827.

(60) Provisional application No. 60/587,555, filed on Jul. 14, 2004.

(51) Int. Cl.
*G06K 9/00* (2006.01)
(52) U.S. Cl.
USPC ....... 382/251; 382/245; 382/250; 375/240.23
(58) Field of Classification Search
USPC .................. 382/245, 250, 251; 375/240.23
See application file for complete search history.

(56) References Cited

U.S. PATENT DOCUMENTS

| 5,682,152 A | 10/1997 | Wang et al. |
| 5,734,755 A | 3/1998 | Ramchandran et al. |
| 5,926,222 A | 7/1999 | Nickerson |
| 5,991,451 A | 11/1999 | Keith et al. |

(Continued)

FOREIGN PATENT DOCUMENTS

| EP | 1333679 A1 | 8/2003 |
| EP | 1453208 A1 | 9/2004 |

(Continued)

OTHER PUBLICATIONS

Document relating to SG Application No. 200904746-5, dated Jul. 23, 2009 (Formalities Examination Report).

(Continued)

*Primary Examiner* — Chan Park
*Assistant Examiner* — Eueng-Nan Yeh
(74) *Attorney, Agent, or Firm* — Bereskin & Parr LLP/S.E.N.C.R.L., s.r.l.

(57) ABSTRACT

A method, system and computer software product for improving rate-distortion performance while remaining faithful to JPEG/MPEG syntax, involving joint optimization of Huffman tables, quantization step sizes and quantized coefficients of a JPEG/MPEG encoder. This involves finding the optimal coefficient indices in the form of (run, size) pairs. By employing an interative process including this search for optimal coefficient indices, joint improvement of run-length coding, Huffman coding and quantization table selection may be achieved. Additionally, the compression of quantized DC coefficients may also be improved using a trellis-structure.

21 Claims, 19 Drawing Sheets

(56) References Cited

U.S. PATENT DOCUMENTS

| | | | |
|---|---|---|---|
| 6,167,162 A * | 12/2000 | Jacquin et al. | 382/251 |
| 6,212,302 B1 | 4/2001 | Honsinger et al. | |
| 6,349,151 B1 | 2/2002 | Jones et al. | |
| 6,356,668 B1 | 3/2002 | Honsinger et al. | |
| 6,507,616 B1 | 1/2003 | Ryu | |
| 6,594,398 B1 | 7/2003 | Wu et al. | |
| 6,891,889 B2 | 5/2005 | Kim et al. | |
| 6,925,120 B2 | 8/2005 | Zhang et al. | |
| 6,999,432 B2 | 2/2006 | Zhang et al. | |
| 7,010,037 B2 | 3/2006 | Ye et al. | |
| 7,149,360 B2 | 12/2006 | Brake et al. | |
| 7,742,643 B2 | 6/2010 | Yang et al. | |
| 7,978,923 B2 | 7/2011 | Yang et al. | |
| 2002/0118953 A1* | 8/2002 | Kim | 386/70 |
| 2003/0179937 A1 | 9/2003 | Brake et al. | |
| 2004/0028131 A1 | 2/2004 | Ye et al. | |
| 2004/0066973 A1 | 4/2004 | Prakash et al. | |
| 2004/0120398 A1 | 6/2004 | Zhang et al. | |
| 2004/0131121 A1* | 7/2004 | Dumitras et al. | 375/240.16 |
| 2004/0179606 A1 | 9/2004 | Zhou et al. | |
| 2005/0015248 A1 | 1/2005 | Kadono et al. | |
| 2005/0052294 A1 | 3/2005 | Liang et al. | |
| 2006/0013300 A1 | 1/2006 | Han | |
| 2007/0047639 A1 | 3/2007 | Ye | |

FOREIGN PATENT DOCUMENTS

| | | |
|---|---|---|
| JP | 6021830 A | 1/1994 |
| JP | 6237184 A | 8/1994 |
| JP | 8079088 A | 3/1996 |

OTHER PUBLICATIONS

Document relating to U.S. Appl. No. 13/166,951, dated May 30, 2012 (Office Action).
Document relating to U.S. Appl. No. 13/166,951, dated Dec. 3, 2012 (Notice of Allowance).
Document relating to U.S. Appl. No. 13/615,702, dated Dec. 31, 2012 (Office Action).
Document relating to U.S. Appl. No. 12/774,313, dated Nov. 10, 2010 (Office Action).
Document relating to U.S. Appl. No. 10/924,189, dated Feb. 26, 2008 (Office Action).
Document relating to U.S. Appl. No. 10/924,189, dated Jun. 17, 2008 (Office Action).
Document relating to U.S. Appl. No. 10/924,189, dated Dec. 22, 2008 (Office Action).
Document relating to U.S. Appl. No. 12/491,764, dated Oct. 6, 2011 (Office Action).
Document relating to U.S. Appl. No. 11/180,513, dated Feb. 22, 2010 (Notice of Allowance).
Document relating to U.S. Appl. No. 11/180,513, dated Nov. 3, 2009 (Notice of Allowance).
Document relating to U.S. Appl. No. 11/180,513, dated May 12, 2009 (Office Action).
Document relating to U.S. Appl. No. 11/180,513, dated Mar. 27, 2009 (Office Action).
Document relating to IN Application No. 222/DELNP/2007, dated Dec. 30, 2010 (Examination Report).
Document relating to U.S. Appl. No. 13/473,738, dated Jan. 23, 2013 (Office Action).
Document relating to CA Application No. 2,738,144, dated May 31, 2013 (Office Action).
Document relating to IN Application No. 249/DELNP/2007, dated Dec. 31, 2010 (Examination Report).
Document relating to CN Application No. 201010131870.4, dated Nov. 16, 2010 (Office Action).
Document relating to CN Application No. 201010131870.4, dated Aug. 31, 2011 (Office Action).
Document relating to EP Application No. 04761723.8, dated May 7, 2008 (Supplemental European Search Report).
Document relating to EP Application No. 05763567.7, dated May 9, 2008 (Supplemental European Search Report).
Ramchandran K et al., "Bit Allocation for Dependent Quantization with Applications to Multiresolution and MPEG video Coders", IEEE Transactions on Image Processing, IEEE Service Center, Piscataway, NJ, US, vol. 3, No. 5, Sep. 1, 1994, pp. 533-545, XP000476830, ISSN: 1057-7149, Paragraphs [00II]-[0III]; Figures 1-8.
En-Hui Yang et al., "Joint Optimization of 1-59 Run Length Coding, Huffman Coding and Quantization Table with Complete Baseline JPEG Compatibility", Image Processing, 2007, ICIP 2007, IEEE International Conference ON, IEEE, PI, Sep. 2007, pp. III-181, XP031158034, ISBN:978-1-4244-1436-9, the whole document.
Ortega et al., "Optimal Trellis-Based Buffered Compression and Fast Approximations", IEEE Transactions on Image Processing, IEEE Service Center, Piscataway, NJ, US, vol. 3, No. 1, Jan. 1994, pp. 26-39, XP000433559, ISSN: 1057-7149; paragraphs [0III], [00IV]; Figures 2-4.
W. Pennebaker and J. Mitchell, "JPEG Still Image Data Compression Standard," Kluwer Academic Publishers, pp. 401-403, 503, Dec. 31, 1992.
G. Wallace, "The JPEG Still Picture Compression Standard," Commun. ACM, vol. 34, pp. 30-44, Apr. 1991.
J. Huang and T. Meng, "Optimal Quantizer Step Sizes for Transform Coders," in Proc. IEEE Int. Conf. Acoustics, Speech and Signal Processing, pp. 2621-2624, Apr. 1991.
Wen et al., "Trellis-based R-D Optimal Quantization in H.263+", IEEE Transactions on Image Processing, vol. 9, No. 8, Aug. 2000, pp. 1431-1434.
S. Wu and A. Gersho, "Rate-Constrained Picture-Adaptive Quantization for JPEG Baseline Coders," in Proc. IEEE Int. Conf. Acoustics, Speech and Signal Processing, vol. 5, pp. 389-392, Apr. 1993.
V. Ratnaker and M. Livny, "RD-OPT: An Efficient Algorithm for Optimizing DCT Quantization Tables", in Proc. Data Compression Conf., pp. 332-341, Mar. 1995.
V. Ratnaker and M. Livny, "An Efficient Algorithm for Optimizing DCT Quantization", IEEE Trans. Image Processing, vol. 9 pp. 267-270, Feb. 2000.
K. Ramchandran and M. Vetterli, "Rate-Distortion Optimal Fast Thresholding with Complete JPEG/MPEG Decoder Compatibility," IEEE Trans Image Processing, vol. 3 pp. 700-704, Sep. 1994.
M. Crouse and K. Ramchandran, "Joint Thresholding and Quantizer Selection for Decoder-compatible Baseline JPEG," in Proc. IEEE Int. Conf. Acoustics, Speech and Signal Processing, pp. 2331-2334, May 1995.
M. Crouse and K. Ramchandran, "Joint Thresholding and Quatizer Selection for Transform Image Coding: Entropy Constrained Analysis and Applications to Baseline JPEG," IEEE Trans Image Processing, vol. 6, pp. 285-297 Feb. 1997.
E.-H. Yang, Z. Zhang, and T. Berger, "Fixed Slope Universal Lossy Data Compression," IEEE Trans. Inform. Theory, vol. 43, pp. 1465-1476, Sep. 1997.
E.-H. Yang and Z. Zhang, "Variable-Rate Trellis Source Coding." IEEE Trans. Inform. Theory, vol. 45, pp. 586-608, Mar. 1999.
Wavelet Image Compression Construction Kit http://www.geoffdavis.net/Dartmouth/wavelet/wavelet.html; Version 0.3, Jan. 29, 1997.
J. Shapiro, "Embedded Image Coding Using Zerotrees of Wavelet Coefficients", IEE Trans. Signal Processing, vol. 41, pp. 344-3462, Dec. 1993.
A. Said and W.A. Pearlman, "New, Fast, and Efficient Image Codec Based on Set Partitioning in Hierarchical Trees", IEEE Trans. Circuits, Syst., Video Technol, vol. 6, pp. 243-250, Jun. 1996.
D. Taubman, "High Performance Scalable Image Compression with EBCOT", IEEE Trans. Image Processing, vol. 9, pp. 1158-1170, Jul. 2000.
X. Wu, "High-Order Context Modeling and Embedded Conditional Entropy Coding of Wavelet Coefficients for Image Compression", IEEE, Nov. 1997, Department of Computer Science, University of Western Ontario, pp. 1378-1382.
C. Tu, et al., "Adaptive Runlength Coding", IEEE Signal Processing Letters, Mar. 2003, vol. 10, No. 3, pp. 61-64.

(56) References Cited

OTHER PUBLICATIONS

C. Tu, et al., "Context-Based Entropy Coding of Block Transform Coefficients for Image Compression", IEEE Transactions on Image Processing, Nov. 2002, vol. 11, No. 11, pp. 1271-1283.
A. Ortega, et al., "Optimal Trellis-Based Buffered Compression and Fast Approximations", IEEE Transactions on Image Processing, Jan. 1994, vol. 3, No. 1, pp. 26-39.
K. Ramchadran, et al., "Bit Allocation for Dependent Quantization with Applications to Multiresolution and MPEG Video Coders", IEEE Transactions on Image Processing, Sep. 1994, vol. 3, No. 5, pp. 533-545.
E. H. Yang, et al., "Joint Optimization of Run-Length Coding, Huffman Coding and Quantization Table With Complete Baseline JPEG Compatibility", IEEE, Sep. 2007, vol. III, pp. 181-184.
T. Tran, J. Liang, and C. Tu, "Lapped Transform Via Time-Domain Pre- and Post-Filtering", IEEE Trans. Signal Processing, vol. 51, pp. 1557-1571, Jun. 2003.
Document relating to PCT Application No. PCT/CA2005/001084, dated Nov. 2, 2005 (International Search Report and Written Opinion).
Document relating to PCT Application No. PCT/CA2004/001557, dated Jan. 21, 2005 (International Search Report and Written Opinion).
Document relating to PCT Application No. PCT/CA2004/001559, dated Mar. 9, 2005 (Written Opinion).
Document relating to CA Application No. 2,572,812, dated Jul. 16, 2010 (Office Action).
Document relating to CA Application No. 2,572,818, dated Apr. 6, 2009 (Office Action).
Document relating to CA Application No. 2,572,818, dated Sep. 9, 2011 (Office Action).
Document relating to CN Application No. 200480043979.5, dated Jun. 5, 2009 (Office Action).
Document relating to CN Application No. 200580030761.0, dated Sep. 11, 2009 (Office Action).
Document relating to CN Application No. 200580030761.0, dated Nov. 1, 2011 (Office Action).
Document relating to EP Application No. 05763556.7, dated May 9, 2008 (Communication).
Document relating to EP Application No. 05763556.7, dated Apr. 17, 2008 (Supplemental European Search Report).
Document relating to EP Application No. 05763556.7, dated Sep. 4, 2009 (Communication).
Document relating to EP Application No. 05763556.7, dated Sep. 4, 2009 (Annex to Communication).
Document relating to EP Application No. 04761723.8, dated Dec. 23, 2008 (Communication).
Document relating to EP Application No. 04761723.8, dated May 17, 2010 (Decision to Grant).
Document relating to EP Application No. 04761723.8, dated May 7, 2008 (Communication).
Document relating to EP Application No. 04761723.8, dated Apr. 17, 2008 (Supplemental European Search Report).
Document relating to EP Application No. 04761723.8, dated Nov. 13, 2009 (Communication).
Document relating to SG Application No. 200904747-3, dated Jul. 23, 2009 (Formalities Examination Report).

* cited by examiner

Appendix A: Procedure of the graph-based run-length coding optimization for each block j

Notations:

$C_i$ – the $i^{th}$ DCT coefficient ($1 \le i \le 63$) of block $j$;

c_abs(i) – absolute value of $C_i$;

$q_i$ – the current quantization step size for the $i^{th}$ DCT coefficient in zigzag order;

s_min(s) – the minimum absolute number in size group $s$ ($1 \le s \le 10$);

s_max(s) – the maximum absolute number in size group $s$ ($1 \le s \le 10$);

$P(r,s)$ – run-size probability distribution associated with the pair (r,s);

dist(r,i) – mean square distortion of dropping all the coefficients between state $i$-$r$-$1$ and state $i$, i.e., $dist(r,i) = \sum_{k=i-r}^{i-1} C_k^2$;

ent(r,s) – entropy rate associated with the pair (r, s), i.e., $ent(r,s) = -\log_2 P(r,s) + s$;

d(i, s) – mean square distortion resulting from $C_i$ when the corresponding index is forced into size group $s$;

ID(i, s) – index to be sent for $C_i$ when the index is in size group s;

state(i).r – the *run* part of the last *(r, s)* pair on the optimal path to state *i*;

state(i).s – the *size* part of the last *(r, s)* pair on the optimal path to state *i*;

state(i).ID – index to be sent for $C_i$;

state(i).cost – the minimum Lagrangian cost to state *i*;

eob_cost(i) – the cost of dropping the coefficients after state *i*, i.e., $eob\_cost(i) = \sum_{k=i+1}^{63} C_k^2(j) + \lambda \bullet ent(0,0)$;

$J^*(i)$ – the total minimum cost of a full path where the $i^{th}$ index is the last nonzero index.

Fig. 6a

Initialization:

Pre-calculate ent(r, s) based on $P_0$ and set the state 0 appropriately (we do not optimize DC coefficient in this procedure).

For each 8x8 block, pre-calculate dist(r, i) and eob_cost(i) recursively.

Procedure (find the optimal run-size pairs and in-category indices for one block):

/* step 1: find the distortion and in-category index if $C_i$ is forced to size group s */ for each state i ($1 \leq i \leq 63$))

ind = $C_i // q_i$            /* '//' stands for division with rounding */ s = size_group(ind)      /* size_group() is used to find the size group of ind */

$d(i,s) = (C_i - ind * q_i)^2$

ID(i,s) = ind for $1 \leq size \leq s-1$ $d(i,size) = (c\_abs(i) - s\_max(size) * q_i)^2$ ;

ID(i,size)= ($C_i < 0$) ? (-s_max(size)) : s_max(size);

for $s + 1 \leq size \leq 10$ $d(i,size) = (c\_abs(i) - s\_min(size) * q_i)^2$ ;

ID(i,size)= ($C_i < 0$) ? (-s_min(size)) : s_min(size);

Fig. 6b

/* step 2: find the optimal path where the $i^{th}$ index is the last nonzero index to be sent */ for each state $i$ ( $1 \leq i \leq 63$ )

current_minicost = a large number for each state i-r-1 ( $0 \leq r \leq i-1$ for i<16, $0 \leq r \leq 15$ for $i \geq 16$ )

for each size group s ( $1 \leq s \leq 10$ )

dist_inc = dist(r, i) + d(i, s)

J = state(i-r-1).cost + dist_inc + $\lambda$*ent(r, s)

if (J < current_minicost)

current_minicost = J record *r, s, ID(i,s)*, and *current_minicost* to state *i*

/* consider the special transition *(15,0)* for state $i$ ( $i \geq 16$ ) */ if ( $16 \leq i \leq 62$ ) /* state 63 does not have *(15,0)* incoming transition */ dist_inc = dist(15, i)+$C_i^2$

J = state(i-16).cost + dist_inc + $\lambda$*ent(15, 0)

if (J < current_minicost)

current_minicost = J record *r, s, 0* and *current_minicost* to state *i*

/* find the total cost of the full path */

$J^*(i) = state(i).cost + eob\_cost(i)$

/* step 3: find the optimal path for current block */

Find the minimum Lagrangian cost by comparing $J^*(i)$ ( $0 \leq i \leq 63$ ), then trace back to obtain the optimal run-size pairs and the corresponding indices.

Fig. 6c

METHOD, SYSTEM AND COMPUTER PROGRAM PRODUCT FOR OPTIMIZATION OF DATA COMPRESSION WITH ITERATIVE COST FUNCTION

CROSS-REFERENCE TO RELATED APPLICATIONS

This application is a divisional of U.S. patent application Ser. No. 13/473,738, filed May 17, 2012, which is a divisional of U.S. patent application Ser. No. 12/491,764, filed Jun. 25, 2009, which is a divisional of U.S. patent application Ser. No. 10/924,189, filed on Aug. 24, 2004, which claims the benefit of U.S. Provisional Application No. 60/587,555, filed on Jul. 14, 2004. U.S. patent application Ser. No. 10/924,189 issued to patent as U.S. Pat. No. 7,570,827. U.S. patent application Ser. No. 12/491,764 issued to patent as U.S. Pat. No. 8,194,990. The entire contents of U.S. application Ser. No. 13/473,738, U.S. application Ser. No. 12/491,764, U.S. application Ser. No. 10/924,189, and U.S. Application No. 60/587,555 are hereby incorporated by reference.

FIELD OF THE INVENTION

The present invention relates generally to data compression, and more specifically relates to the joint optimization of the Huffman tables, quantization step sizes, and quantized coefficients of a JPEG encoder.

BACKGROUND OF THE INVENTION

JPEG as described in W. Pennebaker and J. Mitchell, "JPEG still image data compression standard," Kluwer Academic Publishers, 1993, (hereinafter "reference [1]"), G. Wallace, "The JPEG still-image compression standard," Commun. ACM, vol. 34, pp. 30-44, April 1991 (hereinafter "reference [2]"), is a popular DCT-based still image compression standard. It has spurred a wide-ranging usage of JPEG format such as on the World-Wide-Web and in digital cameras.

The popularity of the JPEG coding system has motivated the study of JPEG optimization schemes—see for example J. Huang and T. Meng, "Optimal quantizer step sizes for transform coders," in Proc. IEEE Int. Conf. Acoustics, Speech and Signal Processing, pp. 2621-2624, April 1991 (hereinafter "reference [3]"), S. Wu and A. Gersho, "Rate-constrained picture-adaptive quantization for JPEG baseline coders," in Proc. IEEE Int. Conf. Acoustics, Speech and Signal Processing, vol. 5, pp. 389-392, 1993 (hereinafter "reference [4]"), V. Ratnakar and M. Livny, "RD-OPT: An efficient algorithm for optimizing DCT quantization tables", in Proc. Data Compression Conf., pp. 332-341, 1995 (hereinafter "reference [5]") and V. Ratnakar and M. Livny, "An efficient algorithm for optimizing DCT quantization," IEEE Trans. Image Processing, vol. 9 pp. 267-270, February 2000 (hereinafter "reference [6]"), K. Ramchandran and M. Vetterli, "Rate-distortion optimal fast thresholding with complete JPEG/MPEG decoder compatibility," IEEE Trans Image Processing, vol. 3, pp. 700-704, September 1994 (hereinafter "reference [7]"), M. Crouse and K. Ramchandran, "Joint thresholding and quantizer selection for decoder-compatible baseline JPEG," in Proc. IEEE Int. Conf. Acoustics, Speech and Signal Processing, pp. 2331-2334, 1995 (hereinafter "reference [8]") and M. Crouse and K. Ramchandran, "Joint thresholding and quantizer selection for transform image coding: Entropy constrained analysis and applications to baseline JPEG," IEEE Trans. Image Processing, vol. 6, pp. 285-297, February 1997 (hereinafter "reference [9]"). The schemes described in all of these references remain faithful to the JPEG syntax. Since such schemes only optimize the JPEG encoders without changing the standard JPEG decoders, they can not only further reduce the size of JPEG compressed images, but also have the advantage of being easily deployable. This unique feature makes them attractive in applications where the receiving terminals are not sophisticated to support new decoders, such as in wireless communications.

Quantization Table Optimization

JPEG's quantization step sizes largely determine the rate-distortion tradeoff in a JPEG compressed image. However, using the default quantization tables is suboptimal since these tables are image-independent. Therefore, the purpose of any quantization table optimization scheme is to obtain an efficient, image-adaptive quantization table for each image component. The problem of quantization table optimization can be formulated easily as follows. (Without loss of generality we only consider one image component in the following discussion.) Given an input image with a target bit rate $R_{budget}$, one wants to find a set of quantization step sizes $\{Q_k : k=0, \ldots, 63\}$ to minimize the overall distortion $$D = \sum_{n=1}^{Num\_Blk} \sum_{k=0}^{63} D_{n,k}(Q_k) \tag{1}$$

subject to the bit rate constraint $$R = \sum_{n=1}^{Num\_Blk} R_n(Q_0, \ldots, Q_{63}) \leq R_{budget} \tag{2}$$

where Num_Blk is the number of blocks, $D_{n,k}(Q_k)$ is the distortion of the $k^{th}$ DCT coefficient in the $n^{th}$ block if it is quantized with the step size $Q_k$, and $R_n(Q_0, \ldots, Q_{63})$ is the number of bits generated in coding the $n^{th}$ block with the quantization table $\{Q_0, \ldots, Q_{63}\}$.

Since JPEG uses zero run-length coding, which combines zero coefficient indices from different frequency bands into one symbol, the bit rate is not simply the sum of bits contributed by coding each individual coefficient index. Therefore, it is difficult to obtain an optimal solution to (1) and (2) with classical bit allocation techniques. Huang and Meng—see reference [3]—proposed a gradient descent technique to solve for a locally optimal solution to the quantization table design problem based on the assumption that the probability distributions of the DCT coefficients are Laplacian. A greedy, steepest-descent optimization scheme was proposed later which makes no assumptions on the probability distribution of the DCT coefficients—see reference [4]. Starting with an initial quantization table of large step sizes, corresponding to low bit rate and high distortion, their algorithm decreases the step size in one entry of the quantization table at a time until a target bit rate is reached. In each iteration, they try to update the quantization table in such a way that the ratio of decrease in distortion to increase in bit rate is maximized over all possible reduced step size values for one entry of the quantization table. Mathematically, their algorithm seeks the values of k and q that solve the following maximization problem $$\max_{k} \max_{q} \frac{-\Delta D|_{Q_k \to q}}{\Delta R|_{Q_k \to q}} \quad (3)$$

where $\Delta D|_{Q_k \to q}$ and $\Delta R|_{Q_k \to q}$ are respectively the change in distortion and that in overall bit rate when the $k^{th}$ entry of the quantization table, $Q_k$, is replaced by q. These increments can be calculated by $$\Delta D|_{Q_k \to q} = \sum_{n=1}^{Num\_Blk} [D_{n,k}(q) - D_{n,k}(Q_k)] \quad (4)$$

and $$\Delta R|_{Q_k \to q} = \sum_{n=1}^{Num\_Blk} [R_n(Q_0, \ldots, q, \ldots, Q_{63}) - R_n(Q_0, \ldots, Q_k, \ldots, Q_{63})] \quad (5)$$

The iteration is repeated until $|R_{budget} - R(Q_0, \ldots, Q_{63})| \le \epsilon$, where $\epsilon$ is the convergence criterion specified by the user.

Both algorithms aforementioned are very computationally expensive. Ratnakar and Livny—see references [5] and [6]—proposed a comparatively efficient algorithm to construct the quantization table based on the DCT coefficient distribution statistics without repeating the entire compression-decompression cycle. They employed a dynamic programming approach to optimizing quantization tables over a wide range of rates and distortions and achieved a similar performance as the scheme in reference [4].

Optimal Thresholding

In JPEG, the same quantization table must be applied to every image block. This is also true even when an image-adaptive quantization table is used. Thus, JPEG quantization lacks local adaptivity, indicating the potential gain remains from exploiting discrepancies between a particular block's characteristics and the average block statistics. This is the motivation for the optimal fast thresholding algorithm of—see reference [7], which drops the less significant coefficient indices in the R-D sense. Mathematically, it minimizes the distortion, for a fixed quantizer, between the original image X and the thresholded image $\tilde{X}$ given the quantized image $\hat{X}$ subject to a bit budget constraint, i.e., $$\min[D(X,\tilde{X})|\hat{X}] \text{ subject to } R(\tilde{X}) \le R_{budget} \quad (6)$$

An equivalent unconstrained problem is to minimize $$J(\lambda) = D(X,\tilde{X}) + \lambda R(\tilde{X}) \quad (7)$$

A dynamic programming algorithm is employed to solve the above optimization problem (7) recursively. It calculates $J^*_k$ for each $0 \le k \le 63$, and then finds $k^*$ that minimizes this $J^*_k$, i.e., finding the best nonzero coefficient to end the scan within each block independently. The reader is referred to reference [7] for details. Since only the less significant coefficient indices can be changed, the optimal fast thresholding algorithm—see reference [7]—does not address the full optimization of the coefficient indices with JPEG decoder compatibility.

Joint Thresholding and Quantizer Selection

Since an adaptive quantizer selection scheme exploits image-wide statistics, while the thresholding algorithm exploits block-level statistics, their operations are nearly "orthogonal". This indicates that it is beneficial to bind them together. The Huffman table is another free parameter left to a JPEG encoder. Therefore, Crouse and Ramchandran—see references [8] and [9]—proposed a joint optimization scheme over these three parameters, i.e., $$\min_{T,Q,H} D(T, Q) \text{ subject to } R(T, Q, H) \le R_{budget} \quad (8)$$

where Q is the quantization table, H is the Huffman table incorporated, and T is a set of binary thresholding tags that signal whether to threshold a coefficient index. The constrained minimization problem of (8) is converted into an unconstrained problem by the Lagrange multiplier as $$\min_{T,Q,H} [J(\lambda) = D(T, Q) + \lambda R(T, Q, H)] \quad (9)$$

Then, they proposed an algorithm that iteratively chooses each of Q,T,H to minimize the Lagrangian cost (9) given that the other parameters are fixed.

SUMMARY OF THE INVENTION

In accordance with a first aspect of the invention, there is provided a method of compressing a sequence of n coefficients by determining a cost-determined sequence of n coefficient indices represented by a cost-determined sequence of (run, size, ID) triples under a given quantization table and run-size distribution, wherein each sequence of (run, size, ID) triples defines a corresponding sequence of coefficient indices such that (i) each index in the corresponding sequence of coefficient indices is a digital number, (ii) the corresponding sequence of coefficient indices includes a plurality of values including a special value, and (iii) each (run, size, ID) triple defines a run value representing a number of consecutive indices of the special value, an integer value ID specifying the amplitude of the index following the number of consecutive indices of the special value, and a size value defining a number of bits required to store an index within a category specified by the ID value. The method comprises the steps of: (a) using the given quantization table and run-size distribution to formulate a cost function for a plurality of possible sequences of (run, size, ID) triples; (b) applying the cost function to each possible sequence in the plurality of possible sequences of (run, size, ID) triples to determine an associated cost; and (c) selecting the cost-determined sequence of (run, size, ID) triples from the plurality of possible sequences of (run, size, ID) triples based on the associated cost function of possible sequences of (run, size, ID) triples; and encoding the corresponding selected sequence of (run, size, ID) triples using Huffman coding.

In accordance with a second aspect of the invention, there is provided a method of compressing a sequence of n coefficients under a given quantization table and run-size distribution by using a graph to represent a plurality of possible sequences of (run, size, ID) triples, which, together with the corresponding in-category indices ID and the given quantization table, determine sequences of n quantized coefficients, wherein each sequence of (run, size, ID) triples defines a corresponding sequence of coefficient indices such that (i) each index in the corresponding sequence of coefficient indices is a digital number, (ii) the corresponding sequence of coefficient indices includes a plurality of values including a special value, and (iii) each (run, size, ID) triple defines a run value representing a number of consecutive indices of the special value, an integer value ID specifying the amplitude of the index following the number of consecutive indices of the special value, and a size value defining a number of bits required to store an index within the category specified by the ID value. The method comprises the steps of: (a) using the given quantization table and run-size distribution to formulate a cost function for a plurality of possible sequences of (run, size) pairs; (b) constructing a graph to represent the plurality of possible sequences of (run, size) pairs; (c) determining a path of the graph extending from the first node of the graph to the end node of the graph based on an associated cost determined by a cost function; (d) determining the corresponding sequence of (run, size, ID) triples from the selected path; and (e) encoding the corresponding sequence of (run, size, ID) triples using Huffman coding.

In accordance with a third aspect of the invention, there is provided a method of compressing a sequence of n coefficients by jointly determining an output quantization table, a cost-determined sequence of coefficient indices represented by a cost-determined sequence of (run, size, ID) triples, and a run-size distribution, wherein each sequence of (run, size, ID) triples defines a corresponding sequence of coefficient indices such that (i) each index in the corresponding sequence of coefficient indices is a digital number, (ii) the corresponding sequence of coefficient indices includes a plurality of values including a special value, and (iii) each (run, size, ID) triple defines a run value representing a number of consecutive indices of the special value, an integer value ID specifying the amplitude of the index following the number of consecutive indices of the special value, and a size value defining a number of bits required to store an index within a category specified by the ID value, and wherein a sequence of coefficient indices together with a quantization table determines a sequence of n soft-decision quantized coefficients. The method comprises: (a) selecting a $0^{th}$ quantization table; (b) selecting a $0^{th}$ run-size distribution; (c) setting a counter t equal to 0; (d) using a $t^{th}$ quantization table and run-size distribution to formulate a $t^{th}$ cost function for a $t^{th}$ plurality of possible sequences of (run, size, ID) triples; (e) applying the cost function to each possible sequence in the $t^{th}$ plurality of possible sequences of (run, size, ID) triples to determine an associated cost; (f) selecting a $t^{th}$ cost-determined sequence of (run, size, ID) triples from the $t^{th}$ plurality of possible sequences of (run, size, ID) triples based on the associated cost; (g) if the $t^{th}$ cost-determined sequence of (run, size, ID) triples, together with the $t^{th}$ quantization table and run-size distribution, meets a selection criterion, selecting the $t^{th}$ cost-determined sequence of (run, size, ID) triples as the cost-determined sequence of (run, size, ID) triples, and the $t^{th}$ quantization table as the output quantization table; otherwise determining a $(t+1)^{th}$ quantization table and run-size distribution from the $t^{th}$ cost-determined sequence of (run, size, ID) triples, increasing t by one, and returning to step (d); and (h) encoding the corresponding selected sequence of (run, size, ID) triples using Huffman coding.

In accordance with a fourth aspect of the invention, there is provided a method of compressing a sequence of sequences of n coefficients by jointly determining an output quantization table, an output run-size distribution, and, for each sequence of n coefficients in the sequence of sequences of n coefficients, a final cost-determined sequence of coefficient indices represented by a final cost-determined sequence of (run, size, ID) triples, wherein each sequence of (run, size, ID) triples defines a corresponding sequence of coefficient indices such that (i) each index in the corresponding sequence of coefficient indices is a digital number, (ii) the corresponding sequence of coefficient indices includes a plurality of values including a special value, and (iii) each (run, size, ID) triple defines a run value representing a number of consecutive indices of the special value, an integer value ID specifying the amplitude of the index following the number of consecutive indices of the special value, and a size value defining a number of bits required to store an index within a category specified by the ID value, and wherein a sequence of coefficient indices together with a quantization table determines a sequence of n soft-decision quantized coefficients. The method comprises: (a) selecting a $0^{th}$ quantization table; (b) selecting a $0^{th}$ run-size distribution; (c) setting a counter t equal to 0; (d) for each sequence of n coefficients in the sequence of sequences of n coefficients, (i) using a $t^{th}$ quantization table and run-size distribution to formulate a $t^{th}$ cost function for an associated $t^{th}$ plurality of possible sequences of (run, size, ID) triples; (ii) applying the cost function to each possible sequence in the associated $t^{th}$ plurality of possible sequences of (run, size, ID) triples to determine an associated cost; (iii) selecting an associated $t^{th}$ cost-determined sequence of (run, size, ID) triples from the associated $t^{th}$ plurality of possible sequences of (run, size, ID) triples based on the associated cost; (e) after step (d), applying an aggregate cost function to the $t^{th}$ associated cost-determined sequence of (run, size, ID) triples for each sequence of n coefficients in the sequence of sequences of n coefficients, to determine a $t^{th}$ aggregate cost; (f) if the $t^{th}$ aggregate cost meets a selection criterion, selecting the $t^{th}$ quantization table and run-size distribution as the output quantization table and run-size distribution, and, for each sequence of n coefficients in the sequence of sequences of n coefficients, the final cost-determined sequence of coefficient indices represented by the final cost-determined sequence of (run, size, ID) triples as the associated $t^{th}$ sequence of (run, size, ID) triples; otherwise determining a $(t+1)^{th}$ quantization table and run-size distribution from the selected sequence of the $t^{th}$ cost-determined sequences of (run, size, ID) triples, increasing t by one, and returning to step (d); and (g) encoding the corresponding selected sequences of (run, size, ID) triples using Huffman coding.

In accordance with a fifth aspect of the invention, there is provided a method of compressing a sequence of N coefficients by determining a cost-determined sequence of N indices represented by a corresponding cost-determined sequence of differences under a given quantization step size and a given size distribution, wherein each sequence of differences defines a corresponding sequence of N indices such that each difference in the sequence of differences is a digital number equaling an $i^{th}$ index value minus an $(i-1)^{th}$ index value, i being greater than 0 and less than N-1. The method comprises the steps of: (a) using the given quantization step size and the given size distribution to formulate a cost function for a plurality of possible sequences of differences; (b) applying the cost function to each possible sequence in the plurality of possible sequences of differences to determine an associated cost; and (c) selecting the corresponding cost-determined sequence of differences from the plurality of possible sequences of differences based on the associated cost, and determining the cost-determined sequence of N indices from the corresponding cost-determined sequence of differences.

In accordance with a sixth aspect of the invention, there is provided a method of compressing a sequence of N coefficients by jointly determining an output quantization step size, an output cost-determined sequence of N indices represented by a corresponding cost-determined sequence of differences under the output quantization step size and an output size distribution, wherein each sequence of differences defines a corresponding sequence of N indices such that each difference in the sequence of differences is a digital number equaling an $i^{th}$ index value minus an $(i-1)^{th}$ index value, i being greater than 0 and less than N-1. The method comprises the steps of: (a) selecting a $0^{th}$ quantization step size and a $0^{th}$ size distribution; (b) setting a counter t equal to zero; (c) using a $t^{th}$ quantization step size and a $t^{th}$ size distribution to formulate a $t^{th}$ cost function for a $t^{th}$ plurality of possible sequences of differences; (d) applying the $t^{th}$ cost function to each possible sequence in the $t^{th}$ plurality of possible sequences of differences to determine an associated cost; (e) selecting a $t^{th}$ corresponding cost-determined sequence of differences from the $t^{th}$ plurality of possible sequences of differences based on the associated cost; (f) if the $t^{th}$ corresponding cost-determined sequence of differences together with the $t^{th}$ quantization step size and the $t^{th}$ size distribution meet a selection criterion, selecting the $t^{th}$ cost-determined sequence of differences as the output cost-determined sequence of differences, the $t^{th}$ quantization step size as the output quantization step size, the $t^{th}$ size distribution as the output quantization step size, and a $t^{th}$ cost-determined sequence of N indices as the output cost-determined sequence of N indices; otherwise determining a $(t+1)^{th}$ quantization step size and a $(t+1)^{th}$ size distribution from the $t^{th}$ cost-determined sequence of differences, increasing t by one and returning to step (c).

In accordance with a seventh aspect of the invention, there is provided a data processing system for compressing a sequence of n coefficients by determining a cost-determined sequence of n coefficient indices represented by a cost-determined sequence of (run, size, ID) triples under a given quantization table and run-size distribution, wherein each sequence of (run, size, ID) triples defines a corresponding sequence of coefficient indices such that (i) each index in the corresponding sequence of coefficient indices is a digital number, (ii) the corresponding sequence of coefficient indices includes a plurality of values including a special value, and (iii) each (run, size, ID) triple defines a run value representing a number of consecutive indices of the special value, an integer value ID specifying the amplitude of the index following the number of consecutive indices of the special value, and a size value defining a number of bits required to store an index within a category specified by the ID value. The data processing system comprises (a) initialization means for formulating a cost function for a plurality of possible sequences of (run, size, ID) triples using the given quantization table and run-size distribution; and (b) calculation means for applying the cost function to each possible sequence in the plurality of possible sequences of (run, size, ID) triples to determine an associated cost, and for selecting the cost-determined sequence of (run, size, ID) triples from the plurality of possible sequences of (run, size, ID) triples based on the associated cost function of possible sequences of (run, size, ID) triples; and encoding the corresponding selected sequence of (run, size, ID) triples using Huffman coding.

In accordance with an eighth aspect of the invention, there is provided a data processing system for compressing a sequence of n coefficients under a given quantization table and run-size distribution by using a graph to represent a plurality of possible sequences of (run, size, ID) triples, which, together with the corresponding in-category indices ID and the given quantization table, determine sequences of n quantized coefficients, wherein each sequence of (run, size, ID) triples defines a corresponding sequence of coefficient indices such that (i) each index in the corresponding sequence of coefficient indices is a digital number, (ii) the corresponding sequence of coefficient indices includes a plurality of values including a special value, and (iii) each (run, size, ID) triple defines a run value representing a number of consecutive indices of the special value, an integer value ID specifying the amplitude of the index following the number of consecutive indices of the special value, and a size value defining a number of bits required to store an index within the category specified by the ID value. The data processing system comprises (a) initialization means for using the given quantization table and run-size distribution to formulate a cost function for a plurality of possible sequences of (run, size) pairs; (b) calculation means for (i) constructing a graph to represent the plurality of possible sequences of (run, size) pairs; (ii) determining a path of the graph extending from the first node of the graph to the end node of the graph based on an associated cost determined by a cost function; (iii) determining the corresponding sequence of (run, size, ID) triples from the selected path; and (iv) encoding the corresponding sequence of (run, size, ID) triples using Huffman coding.

In accordance with a ninth aspect of the invention, there is provided a data processing system for compressing a sequence of n coefficients by jointly determining an output quantization table, a cost-determined sequence of coefficient indices represented by a cost-determined sequence of (run, size, ID) triples, and a run-size distribution, wherein each sequence of (run, size, ID) triples defines a corresponding sequence of coefficient indices such that (i) each index in the corresponding sequence of coefficient indices is a digital number, (ii) the corresponding sequence of coefficient indices includes a plurality of values including a special value, and (iii) each (run, size, ID) triple defines a run value representing a number of consecutive indices of the special value, an integer value ID specifying the amplitude of the index following the number of consecutive indices of the special value, and a size value defining a number of bits required to store an index within a category specified by the ID value, and wherein a sequence of coefficient indices together with a quantization table determines a sequence of n soft-decision quantized coefficients. The data processing system comprises: (a) initialization means for selecting a $0^{th}$ quantization table, a $0^{th}$ run-size distribution, and for setting a counter t equal to 0; (b) calculation means for (i) using a $t^{th}$ quantization table and run-size distribution to formulate a $t^{th}$ cost function for a $t^{th}$ plurality of possible sequences of (run, size, ID) triples; (ii) applying the cost function to each possible sequence in the $t^{th}$ plurality of possible sequences of (run, size, ID) triples to determine an associated cost; (iii) selecting a $t^{th}$ cost-determined sequence of (run, size, ID) triples from the $t^{th}$ plurality of possible sequences of (run, size, ID) triples based on the associated cost; (iv) if the $t^{th}$ cost-determined sequence of (run, size, ID) triples, together with the $t^{th}$ quantization table and run-size distribution, meets a selection criterion, selecting the $t^{th}$ cost-determined sequence of (run, size, ID) triples as the cost-determined sequence of (run, size, ID) triples, and the $t^{th}$ quantization table as the output quantization table; otherwise determining a $(t+1)^{th}$ quantization table and run-size distribution from the $t^{th}$ cost-determined sequence of (run, size, ID) triples, increasing t by one, and returning to step (i); and (v) encoding the corresponding selected sequence of (run, size, ID) triples using Huffman coding.

In accordance with a tenth aspect of the invention, there is provided a data processing system for compressing a sequence of sequences of n coefficients by jointly determining an output quantization table, an output run-size distribution, and, for each sequence of n coefficients in the sequence of sequences of n coefficients, a final cost-determined sequence of coefficient indices represented by a final cost-determined sequence of (run, size, ID) triples, wherein each sequence of (run, size, ID) triples defines a corresponding sequence of coefficient indices such that (i) each index in the corresponding sequence of coefficient indices is a digital number, (ii) the corresponding sequence of coefficient indices includes a plurality of values including a special value, and (iii) each (run, size, ID) triple defines a run value representing a number of consecutive indices of the special value, an integer value ID specifying the amplitude of the index following the number of consecutive indices of the special value, and a size value defining a number of bits required to store an index within a category specified by the ID value, and wherein a sequence of coefficient indices together with a quantization table determines a sequence of n soft-decision quantized coefficients. The data processing system comprises: (a) initialization means for selecting a $0^{th}$ quantization table; selecting a $0^{th}$ run-size distribution, and setting a counter t equal to 0; (b) calculation means for, for each sequence of n coefficients in the sequence of sequences of n coefficients, (i) using a $t^{th}$ quantization table and run-size distribution to formulate a $t^{th}$ cost function for an associated $t^{th}$ plurality of possible sequences of (run, size, ID) triples; (ii) applying the cost function to each possible sequence in the associated $t^{th}$ plurality of possible sequences of (run, size, ID) triples to determine an associated cost; (iii) selecting an associated $t^{th}$ cost-determined sequence of (run, size, ID) triples from the associated $t^{th}$ plurality of possible sequences of (run, size, ID) triples based on the associated cost; (iv) after step (iii), applying an aggregate cost function to the $t^{th}$ associated cost-determined sequence of (run, size, ID) triples for each sequence of n coefficients in the sequence of sequences of n coefficients, to determine a $t^{th}$ aggregate cost; (v) if the $t^{th}$ aggregate cost meets a selection criterion, selecting the $t^{th}$ quantization table and run-size distribution as the output quantization table and run-size distribution, and, for each sequence of n coefficients in the sequence of sequences of n coefficients, the final cost-determined sequence of coefficient indices represented by the final cost-determined sequence of (run, size, ID) triples as the associated $t^{th}$ sequence of (run, size, ID) triples; otherwise determining a $(t+1)^{th}$ quantization table and run-size distribution from the selected sequence of the $t^{th}$ cost-determined sequences of (run, size, ID) triples, increasing t by one, and returning to step (i); and (vi) encoding the corresponding selected sequences of (run, size, ID) triples using Huffman coding.

In accordance with an eleventh aspect of the invention, there is provided a data processing system for compressing a sequence of N coefficients by determining a cost-determined sequence of N indices represented by a corresponding cost-determined sequence of differences under a given quantization step size and a given size distribution, wherein each sequence of differences defines a corresponding sequence of N indices such that each difference in the sequence of differences is a digital number equaling an $i^{th}$ index value minus an $(i-1)^{th}$ index value, i being greater than 0 and less than N−1. The data processing system comprises: (a) initialization means for using the given quantization step size and the given size distribution to formulate a cost function for a plurality of possible sequences of differences; and, (b) calculation means for applying the cost function to each possible sequence in the plurality of possible sequences of differences to determine an associated cost; and selecting the corresponding cost-determined sequence of differences from the plurality of possible sequences of differences based on the associated cost, and determining the cost-determined sequence of N indices from the corresponding cost-determined sequence of differences.

In accordance with a twelfth aspect of the invention, there is provided a data processing system of compressing a sequence of N coefficients by jointly determining an output quantization step size, an output cost-determined sequence of N indices represented by a corresponding cost-determined sequence of differences under the output quantization step size and an output size distribution, wherein each sequence of differences defines a corresponding sequence of N indices such that each difference in the sequence of differences is a digital number equaling an $i^{th}$ index value minus an $(i-1)^{th}$ index value, i being greater than 0 and less than N−1. The data processing system comprises: (a) initialization means for selecting a $0^{th}$ quantization step size and a $0^{th}$ size distribution, and setting a counter t equal to zero; (b) calculation means for (i) using a $t^{th}$ quantization step size and a $t^{th}$ size distribution to formulate a $t^{th}$ cost function for a $t^{th}$ plurality of possible sequences of differences; (ii) applying the $t^{th}$ cost function to each possible sequence in the $t^{th}$ plurality of possible sequences of differences to determine an associated cost; (iii) selecting a $t^{th}$ corresponding cost-determined sequence of differences from the $t^{th}$ plurality of possible sequences of differences based on the associated cost; (iv) if the $t^{th}$ corresponding cost-determined sequence of differences together with the $t^{th}$ quantization step size and the $t^{th}$ size distribution meet a selection criterion, selecting the $t^{th}$ cost-determined sequence of differences as the output cost-determined sequence of differences, the $t^{th}$ quantization step size as the output quantization step size, the $t^{th}$ size distribution as the output quantization step size, and a $t^{th}$ cost-determined sequence of N indices as the output cost-determined sequence of N indices; otherwise determining a $(t+1)^{th}$ quantization step size and a $(t+1)^{th}$ size distribution from the $t^{th}$ cost-determined sequence of differences, increasing t by one and returning to step (i)

In accordance with a thirteenth aspect of the invention, there is provided a computer program product for use on a computer system to compress a sequence of n coefficients by determining a cost-determined sequence of n coefficient indices represented by a cost-determined sequence of (run, size, ID) triples under a given quantization table and run-size distribution, wherein each sequence of (run, size, ID) triples defines a corresponding sequence of coefficient indices such that (i) each index in the corresponding sequence of coefficient indices is a digital number, (ii) the corresponding sequence of coefficient indices includes a plurality of values including a special value, and (iii) each (run, size, ID) triple defines a run value representing a number of consecutive indices of the special value, an integer value ID specifying the amplitude of the index following the number of consecutive indices of the special value, and a size value defining a number of bits required to store an index within a category specified by the ID value. The computer program product comprises a recording medium, and means recorded on the recording medium to instruct the computer system to perform the steps of: (a) using the given quantization table and run-size distribution to formulate a cost function for a plurality of possible sequences of (run, size, ID) triples; (b) applying the cost function to each possible sequence in the plurality of possible sequences of (run, size, ID) triples to determine an associated cost; (c) selecting the cost-determined sequence of (run, size, ID) triples from the plurality of possible sequences of (run, size, ID) triples based on the associated cost function of possible sequences of (run, size, ID) triples; and encoding the corresponding selected sequence of (run, size, ID) triples using Huffman coding.

In accordance with a fourteenth aspect of the invention, there is provided a computer program product for use on a computer system to compress a sequence of n coefficients under a given quantization table and run-size distribution by using a graph to represent a plurality of possible sequences of (run, size, ID) triples, which, together with the corresponding in-category indices ID and the given quantization table, determine sequences of n quantized coefficients, wherein each sequence of (run, size, ID) triples defines a corresponding sequence of coefficient indices such that (i) each index in the corresponding sequence of coefficient indices is a digital number, (ii) the corresponding sequence of coefficient indices includes a plurality of values including a special value, and (iii) each (run, size, ID) triple defines a run value representing a number of consecutive indices of the special value, an integer value ID specifying the amplitude of the index following the number of consecutive indices of the special value, and a size value defining a number of bits required to store an index within the category specified by the ID value. The computer program product comprises a recording medium and means recorded on the medium for instructing the computer to perform the steps of: (a) using the given quantization table and run-size distribution to formulate a cost function for a plurality of possible sequences of (run, size) pairs; (b) constructing a graph to represent the plurality of possible sequences of (run, size) pairs; (c) determining a path of the graph extending from the first node of the graph to the end node of the graph based on an associated cost determined by a cost function; (d) determining the corresponding sequence of (run, size, ID) triples from the selected path; and (e) encoding the corresponding sequence of (run, size, ID) triples using Huffman coding.

In accordance with a fifteenth aspect of the invention, there is provided a computer program product for use on a computer system to compress a sequence of n coefficients by jointly determining an output quantization table, a cost-determined sequence of coefficient indices represented by a cost-determined sequence of (run, size, ID) triples, and a run-size distribution, wherein each sequence of (run, size, ID) triples defines a corresponding sequence of coefficient indices such that (i) each index in the corresponding sequence of coefficient indices is a digital number, (ii) the corresponding sequence of coefficient indices includes a plurality of values including a special value, and (iii) each (run, size, ID) triple defines a run value representing a number of consecutive indices of the special value, an integer value ID specifying the amplitude of the index following the number of consecutive indices of the special value, and a size value defining a number of bits required to store an index within a category specified by the ID value, and wherein a sequence of coefficient indices together with a quantization table determines a sequence of n soft-decision quantized coefficients. The computer program product comprises a recording medium and means recorded on the medium for instructing the computer to perform the steps of: (a) selecting a $0^{th}$ quantization table; (b) selecting a $0^{th}$ run-size distribution; (c) setting a counter t equal to 0; (d) using a $t^{th}$ quantization table and run-size distribution to formulate a $t^{th}$ cost function for a $t^{th}$ plurality of possible sequences of (run, size, ID) triples; (e) applying the cost function to each possible sequence in the $t^{th}$ plurality of possible sequences of (run, size, ID) triples to determine an associated cost; (f) selecting a $t^{th}$ cost-determined sequence of (run, size, ID) triples from the $t^{th}$ plurality of possible sequences of (run, size, ID) triples based on the associated cost; (g) if the $t^{th}$ cost-determined sequence of (run, size, ID) triples, together with the $t^{th}$ quantization table and run-size distribution, meets a selection criterion, selecting the $t^{th}$ cost-determined sequence of (run, size, ID) triples as the cost-determined sequence of (run, size, ID) triples, and the $t^{th}$ quantization table as the output quantization table; otherwise determining a $(t+1)^{th}$ quantization table and run-size distribution from the $t^{th}$ cost-determined sequence of (run, size, ID) triples, increasing t by one, and returning to step (d); and (h) encoding the corresponding selected sequence of (run, size, ID) triples using Huffman coding.

In accordance with a sixteenth aspect of the invention, there is provided a computer program product for use on a computer system to compress a sequence of sequences of n coefficients by jointly determining an output quantization table, an output run-size distribution, and, for each sequence of n coefficients in the sequence of sequences of n coefficients, a final cost-determined sequence of coefficient indices represented by a final cost-determined sequence of (run, size, ID) triples, wherein each sequence of (run, size, ID) triples defines a corresponding sequence of coefficient indices such that (i) each index in the corresponding sequence of coefficient indices is a digital number, (ii) the corresponding sequence of coefficient indices includes a plurality of values including a special value, and (iii) each (run, size, ID) triple defines a run value representing a number of consecutive indices of the special value, an integer value ID specifying the amplitude of the index following the number of consecutive indices of the special value, and a size value defining a number of bits required to store an index within a category specified by the ID value, and wherein a sequence of coefficient indices together with a quantization table determines a sequence of n soft-decision quantized coefficients. The computer program product comprises a recording medium, and means recorded on the recording medium to instruct the computer system to perform the steps of comprises: (a) selecting a $0^{th}$ quantization table; (b) selecting a $0^{th}$ run-size distribution; (c) setting a counter t equal to 0; (d) for each sequence of n coefficients in the sequence of sequences of n coefficients, (i) using a $t^{th}$ quantization table and run-size distribution to formulate a $t^{th}$ cost function for an associated $t^{th}$ plurality of possible sequences of (run, size, ID) triples; (ii) applying the cost function to each possible sequence in the associated $t^{th}$ plurality of possible sequences of (run, size, ID) triples to determine an associated cost; (iii) selecting an associated $t^{th}$ cost-determined sequence of (run, size, ID) triples from the associated t plurality of possible sequences of (run, size, ID) triples based on the associated cost; (e) after step (d), applying an aggregate cost function to the $t^{th}$ associated cost-determined sequence of (run, size, ID) triples for each sequence of n coefficients in the sequence of sequences of n coefficients, to determine a $t^{th}$ aggregate cost; (f) if the $t^{th}$ aggregate cost meets a selection criterion, selecting the $t^{th}$ quantization table and run-size distribution as the output quantization table and run-size distribution, and, for each sequence of n coefficients in the sequence of sequences of n coefficients, the final cost-determined sequence of coefficient indices represented by the final cost-determined sequence of (run, size, ID) triples as the associated $t^{th}$ sequence of (run, size, ID) triples; otherwise determining a $(t+1)^{th}$ quantization table and run-size distribution from the selected sequence of the $t^{th}$ cost-determined sequences of (run, size, ID) triples, increasing t by one, and returning to step (d); and (g) encoding the corresponding selected sequences of (run, size, ID) triples using Huffman coding.

In accordance with a seventeenth aspect of the invention, there is provided a computer program product for use on a computer system to compress a sequence of N coefficients by determining a cost-determined sequence of N indices represented by a corresponding cost-determined sequence of differences under a given quantization step size and a given size distribution, wherein each sequence of differences defines a corresponding sequence of N indices such that each difference in the sequence of differences is a digital number equaling an $i^{th}$ index value minus an $(i-1)^{th}$ index value, i being greater than 0 and less than N−1. The computer program product comprises a recording medium, and means recorded on the recording medium to instruct the computer system to perform the steps of: (a) using the given quantization step size and the given size distribution to formulate a cost function for a plurality of possible sequences of differences; (b) applying the cost function to each possible sequence in the plurality of possible sequences of differences to determine an associated cost; and (c) selecting the corresponding cost-determined sequence of differences from the plurality of possible sequences of differences based on the associated cost, and determining the cost-determined sequence of N indices from the corresponding cost-determined sequence of differences.

In accordance with an eighteenth aspect of the invention, there is provided a computer program product for use on a computer system to compress a sequence of N coefficients by jointly determining an output quantization step size, an output cost-determined sequence of N indices represented by a corresponding cost-determined sequence of differences under the output quantization step size and an output size distribution, wherein each sequence of differences defines a corresponding sequence of N indices such that each difference in the sequence of differences is a digital number equaling an $i^{th}$ index value minus an $(i-1)^{th}$ index value, i being greater than 0 and less than N−1. The computer program product comprises a recording medium, and means recorded on the recording medium to instruct the computer system to perform the steps of: (a) selecting a $0^{th}$ quantization step size and a $0^{th}$ size distribution; (b) setting a counter t equal to zero; (c) using a $t^{th}$ quantization step size and a $t^{th}$ size distribution to formulate a $t^{th}$ cost function for a $t^{th}$ plurality of possible sequences of differences; (d) applying the $t^{th}$ cost function to each possible sequence in the $t^{th}$ plurality of possible sequences of differences to determine an associated cost; (e) selecting a $t^{th}$ corresponding cost-determined sequence of differences from the $t^{th}$ plurality of possible sequences of differences based on the associated cost; (f) if the $t^{th}$ corresponding cost-determined sequence of differences together with the $t^{th}$ quantization step size and the $t^{th}$ size distribution meet a selection criterion, selecting the $t^{th}$ cost-determined sequence of differences as the output cost-determined sequence of differences, the $t^{th}$ quantization step size as the output quantization step size, the $t^{th}$ size distribution as the output quantization step size, and a $t^{th}$ cost-determined sequence of N indices as the output cost-determined sequence of N indices; otherwise determining a $(t+1)^{th}$ quantization step size and a $(t+1)^{th}$ size distribution from the $t^{th}$ cost-determined sequence of differences, increasing t by one and returning to step (c).

BRIEF DESCRIPTION OF THE DRAWINGS

A detailed description of the preferred embodiments is provided herein below with reference to the following drawings, in which:

FIGS. 6a, 6b and 6c is pseudo-code illustrating a graph-based optimization method in accordance with an aspect of the invention;

DETAILED DESCRIPTION OF ASPECTS OF THE INVENTION

Figure 1:
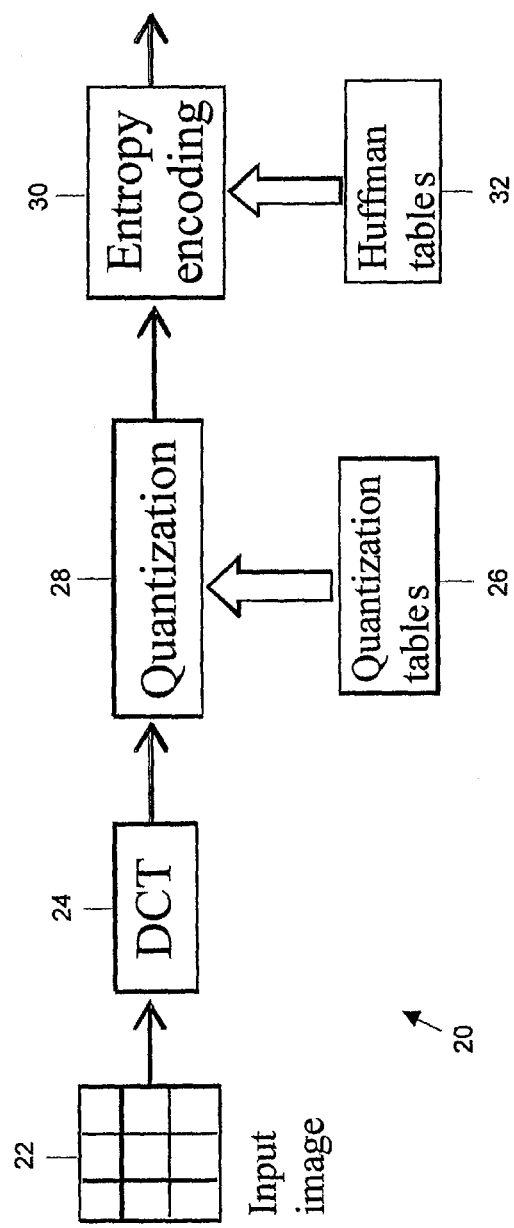
FIG. 1, in a block diagram, illustrates a JPEG encoder.

A JPEG encoder 20 executes of three basic steps as shown in FIG. 1. The encoder 20 first partitions an input image 22 into 8×8 blocks and then processes these 8×8 image blocks one by one in raster scan order (baseline JPEG). Each block is first transformed from the pixel domain to the DCT domain by an 8×8 DCT 24. The resulting DCT coefficients are then uniformly quantized using an 8×8 quantization table 26. The coefficient indices from the quantization 28 are then entropy coded in step 30 using zero run-length coding and Huffman coding. The JPEG syntax leaves the selection of the quantization step sizes and the Huffman code words to the encoder provided the step sizes must be used to quantize all the blocks of an image. This framework offers significant opportunity to apply rate-distortion (R-D) consideration at the encoder 20 where the quantization tables 26 and Huffman tables 32 are two free parameters the encoder can optimize.

Figure 2:
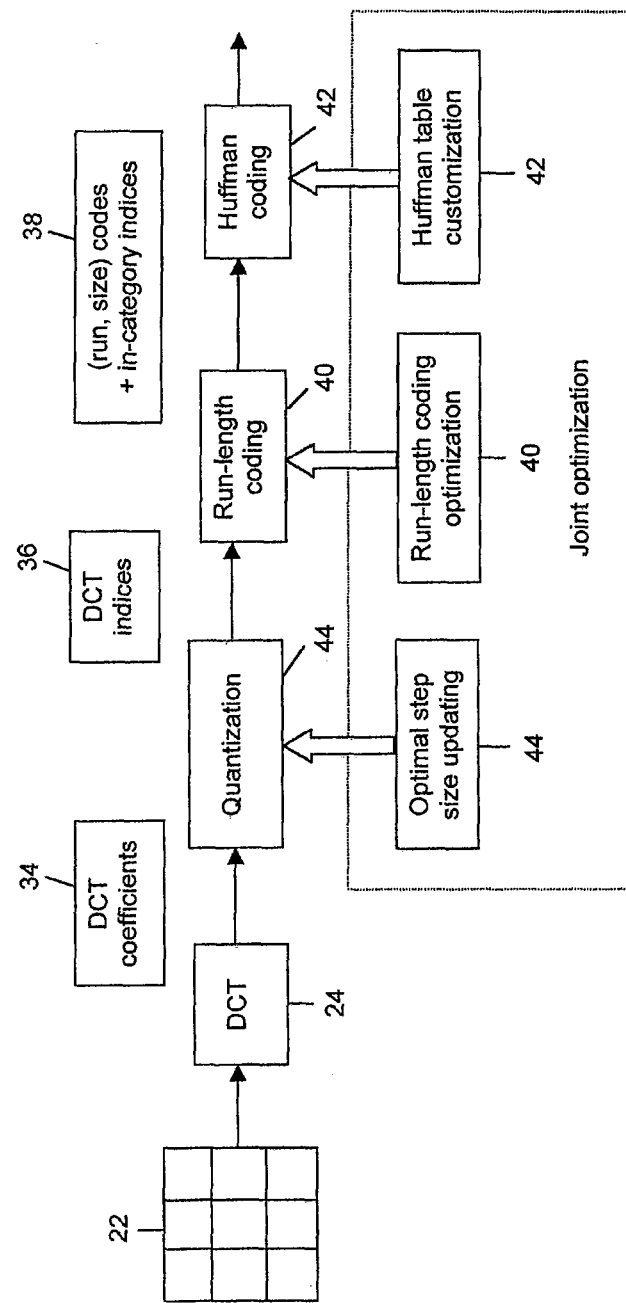
FIG. 2, in a block diagram, illustrates joint optimization of quantization, run-length coding and Huffman coding in accordance with an aspect of the present invention.

The third but somewhat hidden free parameter, which the encoder can also optimize is the image data themselves. Depending on the stage where the image date is at during the whole JPEG encoding process, the image data take different forms as shown in FIG. 2. Before hard decision quantization, they take the form of DCT coefficients 34; after hard decision quantization, they take the form of DCT indices 36, i.e., quantized DCT coefficients normalized by the used quantization step size; after zigzag sequencing and run-length coding, they take the form of run-size pairs followed by integers specifying the exact amplitude of DCT indices within respective categories—(run, size) codes and in-category indices 38. (For clarity, we shall refer to such integers as in-category indices.) Note that DCT indices, together with quantization step sizes, determine quantized DCT coefficients. Although the JPEG syntax allows the quantization tables to be customized at the encoder, typically some scaled versions of the example quantization tables given in the standard—see reference [1]—(called default tables) are used. The scaling of the default tables is suboptimal because the default tables are image-independent and the scaling is not image-adaptive either. Even with an image-adaptive quantization table, JPEG must apply the same table for every image block, indicating that potential gain remains from optimizing the coefficient indices, i.e., DCT indices. Note that hard decision quantization plus coefficient index optimization amounts to soft decision quantization. Since the coefficient indices can be equally represented as run-size pairs followed by in-category indices through run-length coding, we shall simply refer to coefficient index optimization as run-length coding optimization in parallel with step size and Huffman coding optimization. As described below, we not only propose a very neat, graph-based run-length code optimization scheme, but also present an iterative optimization scheme for jointly optimizing the run-length coding, Huffman coding and quantization step sizes as in steps 40, 42 and 44, respectively, of FIG. 2.

Formal Problem Definition

We now formulate our joint optimization problem, where the minimization is done over all the three free parameters in the baseline JPEG. We only consider the optimization of AC coefficients in this section. The optimization of DC coefficients will be discussed below.

Given an input image $I_0$ and a fixed quantization table Q in the JPEG encoding, the coefficient indices completely determine a sequence of run-size pairs followed by in-category indices for each 8×8 block through run-length coding, and vice versa. Our problem is posed as a constrained optimization over all possible sequences of run-size pairs (R, S) followed by in-category indices ID, all possible Huffman tables H, and all possible quantization tables Q $$\min_{(R,S,ID),H,Q} d[I_0, (R, S, ID)_Q] \text{ subject to } r[(R, S), H] \leq r_{budget} \quad (10)$$

or equivalently $$\min_{(R,S,ID),H,Q} r[(R, S), H] \text{ subject to } d[I_0, (R, S, ID)_Q] \leq d_{budget} \quad (11)$$

where $d[I_0,(R,S,ID)_Q]$ denotes the distortion between the original image $I_0$ and the reconstructed image determined by (R,S,ID) and Q over all AC coefficients, and $r[(R,S),H]$ denotes the compression rate for all AC coefficients resulting from the chosen sequence (R, S, ID) and the Huffman table H. In (10) and (11), respectively, $r_{budget}$ and $d_{budget}$ are respectively the rate constraint and distortion constraint. With the help of the Lagrange multiplier, we may convert the rate-constrained problem or distortion constrained problem into the following unconstrained problem $$\min_{(R,S,ID),H,Q} \{J(\lambda) = d[I_0, (R, S, ID)_Q] + \lambda \cdot r[(R, S), H]\} \quad (12)$$

where the Lagrangian multiplier $\lambda$ is a fixed parameter that represents the tradeoff of rate for distortion, and $J(\lambda)$ is the Lagrangian cost. This type of optimization falls into the category of so-called fixed slope coding advocated in E.-h. Yang, Z. Zhang, and T. Berger, "Fixed slope universal lossy data compression," IEEE Trans. Inform. Theory, vol. 43, pp. 1465-1476, September 1997 (hereinafter "reference [10]") and E.-h. Yang and Z. Zhang, "Variable-rate trellis source coding." IEEE Trans. Inform. Theory, vol. 45, pp. 586-608, March 1999 (hereinafter "reference [11]").

It is informative to compare our joint optimization problem with the joint thresholding and quantizer selection—see references [8] and [9]. On one hand, both of them are an iterative process aiming to optimize the three parameters jointly. On the other hand, our scheme differs from that considered—see references [8] and [9]—in two distinct aspects. First, we consider the full optimization of the coefficient indices or the sequence (R,S,ID) instead of a partial optimization represented by dropping only insignificant coefficient indices as considered—see references [8] and [9]. As we shall see in the next section, it turns out that the full optimization has a very neat, computationally effective solution. This is in contrast with the partial optimization for which a relatively time-consuming and cumbersome solution was proposed—see references [7], [8] and [9]. Second, we do not apply any time-consuming quantizer selection schemes to find the R-D optimal step sizes in each iteration. Instead, we use the default quantization table as a starting point and then update the step sizes efficiently in each iteration for local optimization of the step sizes.

Problem Solutions

The rate-distortion optimization problem (12) is a joint optimization of the distortion, rate, Huffman table, quantization table, and sequence (R,S,ID). To make the optimization problem tractable, we propose an iterative algorithm that chooses the sequence (R,S,ID), Huffman table, and quantization table iteratively to minimize the Lagrangian cost of (12), given that the other two parameters are fixed. Since a run-size probability distribution P completely determines a Huffman table, we use P to replace the Huffman table H in the optimization process. The iteration algorithm can be described as follows:

1) Initialize a run-size distribution $P_0$ from the given image $I_0$ and a quantization table $Q_0$. The application of this pre-determined quantization table $Q_0$ to $I_0$ is referred to as hard-quantization, in that quantization is image-independent. (As an example, the initial run-size distribution $P_0$ could be the empirical distribution of the sequence of (run, size) pairs obtained from using a hard-decision quantizer given by the initial $Q_0$ to quantize the DCT coefficients of $I_0$.) Set t=0, and specify a tolerance $\epsilon$ as the convergence criterion.

2) Fix $P_t$ and $Q_t$ for any t≥0. Find an optimal sequence $(R_t,S_t,ID_t)$ that achieves the following minimum $$\min_{R,S,ID} \{J(\lambda) = d[I_0, (R, S, ID)_{Q_t}] + \lambda \cdot r[(R, S), P_t]\}.$$

Denote $d[I_0, (R_t, S_t, ID_t)_{Q_t}] + \lambda \cdot r[(R_t, S_t)P_t]$ by $J^t(\lambda)$.

3) Fix $(R_t, S_t, ID_t)$ Update $Q_t$ and $P_t$ into $Q_{t+1}$ and $P_{t+1}$, respectively so that $Q_{t+1}$ and $P_{t+1}$ together achieve the following minimum $$\min_{(Q,P)}\{J(\lambda) = d[I_0, (R_t, S_t, ID_t)_Q] + \lambda \cdot r[(R_t, S_t)P]\}$$

where the above minimization is taken over all quantization tables Q and all run-size probability distributions P. Note that $P_{t+1}$ can be selected as the empirical run-size distribution of $(R_t, S_t)$.

4) Repeat Steps 2) and 3) for t=0, 1, 2, . . . until $J^t(\lambda) - J^{t+1}(\lambda) \leq \epsilon$. Then output $(R_{t+1}, S_{t+1}, ID_{t+1}) Q_{t+1}$, and $P_{t+1}$.

Since the Lagrangian cost function is non-increasing at each step, convergence is guaranteed. The core of the iteration algorithm is Step 2) and Step 3), i.e., finding the sequence (R,S,ID) to minimize the Lagrangian cost $J(\lambda)$ given Q and P, and updating the quantization step sizes with the new indices of the image. These two steps are addressed separately as follows.

Graph-Based Run-Length Coding Optimization

As mentioned above, JPEG quantization lacks local adaptivity even with an image-adaptive quantization table, which indicates that potential gain remains from the optimization of the coefficient indices themselves. This gain is exploited in Step 2). Optimal thresholding—see reference [7]—only considers a partial optimization of the coefficient indices, i.e., dropping less significant coefficients in the R-D sense. We propose an efficient graph-based optimal path searching algorithm to optimize the coefficient indices fully in the R-D sense. It can not only drop less significant coefficients, but also can change them from one category to another—even changing a zero coefficient to a small nonzero coefficient is possible if needed in the R-D sense. In other words, our graph-based optimal path searching algorithm finds the optimal coefficient indices (or equivalently, the optimal run-size pairs) among all possible coefficient indices (or equivalently, among all possible run-size pairs) to minimize the Lagrangian cost. Since given Q and P, the Lagrangian cost $J(\lambda)$ is block-wise additive, the minimization in Step 2) can be solved in a block by block manner. That is, the optimal sequence (R,S,ID) can be determined independently for every 8×8 image block. Thus, in the following, we limit our discussion to only one 8×8 image block.

Figure 3:
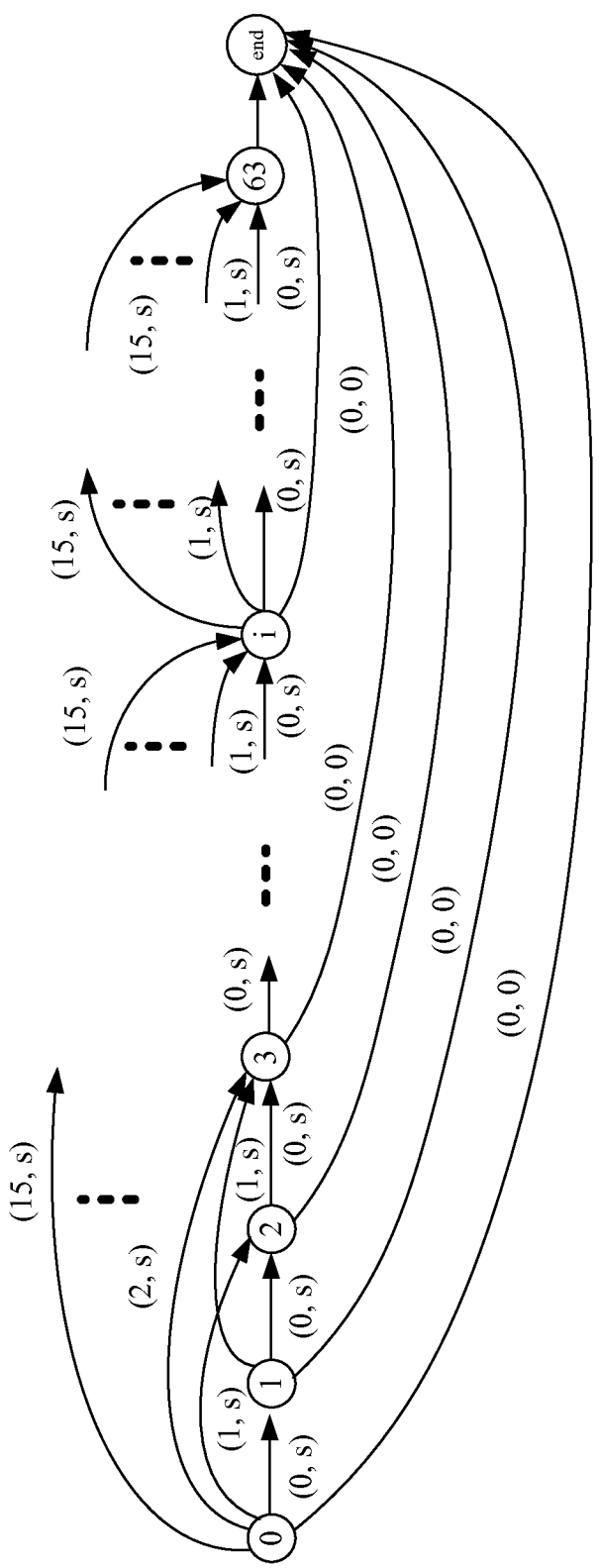
FIG. 3 illustrates a directed graph for representing different possible coefficient indices (or, equivalently, their run-size pairs) in accordance with an aspect of the present invention.

Let us define a directed graph with 65 nodes (or states). As shown in FIG. 3, the first 64 states, numbered as i=0, 1, . . . 63, correspond to the 64 coefficient indices of an 8×8 image block in zigzag order. The last state is a special state called the end state, and will be used to take care of EOB (end-of-block). Each state i(i≤63) may have incoming connections from its previous 16 states j(j<i), which correspond to the run, R, in an (R,S) pair. (In JPEG syntax, R takes value from 0 to 15.) The end state may have incoming connections from all the other states with each connection from state i(i≤62) representing the EOB code, i.e., code (0,0) after the $i^{th}$ coefficient. State 63 goes to the state end without EOB code. For a given state i(i≤63) and its predecessor i−r−1(0≤r≤15), there are 10 parallel transitions between them which correspond to the size group, S, in an (R,S) pair. For simplicity, we only draw one transition in the graph shown in FIG. 3; the complete graph needs the expansion of S. For each state i where i>15, there is one more transition from state i−16 to i which corresponds to the pair (15,0), i.e., ZRL (zero run length) code. We assign to each transition (r,s) from state i−r−1 to state i a cost which is defined as the incremental Lagrangian cost of going from state i−r−1 to state i when the $i^{th}$ DCT coefficient is quantized to size group s (i.e., the coefficient index needs s bits to represent its amplitude) and all the r DCT coefficients appearing immediately before the $i^{th}$ DCT coefficient are quantized to zero. Specifically, this incremental cost is equal to $$\sum_{j=i-r}^{i-1} C_j^2 + |C_i - q_i \cdot ID_i|^2 + \lambda \cdot (-\log_2 P(r, s) + s) \quad (13)$$

Where $C_j$, j=1, 2, . . . 63, are the $j^{th}$ DCT coefficient, $ID_i$ is the in-category index corresponding to the size group s that gives rise to the minimum distortion to $C_i$ among all in-category indices within the category specified by the size groups, and $q_i$ is the $i^{th}$ quantization step size. Similarly, for the transition from state i(i≤62) to the end state, its cost is defined as $$\sum_{j=i+1}^{63} C_j^2 + \lambda \cdot (-\log_2 P(0, 0)) \quad (14)$$

No cost is assigned to the transition from state 63 to the end state.

Figure 4:
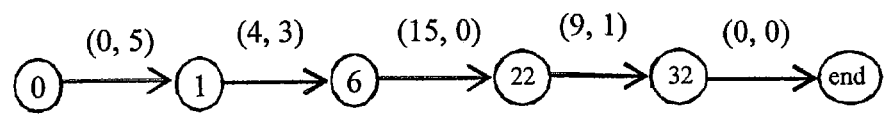
FIG. 4 illustrates a sequence of connections and nodes from the graph of FIG. 3.

It is not hard to see that with the above definitions, every sequence of run-size pairs of an 8×8 block corresponds to a path from state 0 to the end state with a Lagrangian cost. For example, the sequence of run-size pairs (0, 5), (4, 3), (15, 0), (9, 1), (0, 0) of a block corresponds to a path shown in FIG. 4. On the other hand, not all paths from state 0 to the end state in the directed graph represent a legitimate sequence of run-size pairs of an 8×8 block. We shall call such paths illegitimate paths. For instance, the path consisting of a transition (0,5) from state 0 to state 1 followed by a transition (15,0) from state 1 to state 17 and a transition (0,0) from state 17 to the end state is an illegitimate path, and does not represent a legitimate sequence of run-size pairs of an 8×8 block. However, it is not hard to see that for any illegitimate path, there is always a legitimate path the total Lagrangian cost of which is strictly less than that of the illegitimate path. Therefore, the optimal path from state 0 to the end state with the minimum total Lagrangian cost among ALL possible paths including both legitimate paths and illegitimate paths is always a legitimate path. Furthermore, the optimal path, together with its corresponding in-category indices as determined in (13), achieves the minimum in Step 2) for any given Q, P and 8×8 block. As such, one can apply a fast dynamic programming algorithm to the whole directed graph to find the optimal sequence (R,S, ID) for the given 8×8 block. It should be pointed out that baseline JPEG syntax will not generate an (R, S) sequence ended by (15, 0) for an 8×8 block. Theoretically, the optimal (R, S) sequence found by our dynamic programming may end by (15,0) through state 63 even though it is very unlikely to occur in real applications (it might occur when the entropy rate of (15, 0) is less than the entropy rate of (0, 0)). However, an (R, S) sequence ended by (15, 0) through state 63 is a legitimate path and can be encoded/decoded correctly by baseline JPEG syntax.

A more elaborate step-by-step description of the algorithm follows. As an initialization, the algorithm pre-calculates $\lambda \cdot (-\log_2 P(r,s)+s)$ for each run-size pair (r,s) based on the given run-size distribution P. It also recursively pre-calculates, for each state i, the distortion resulting from dropping the preceding 1 to 15 coefficients before the state and the remaining cost of ending the block at the state. The algorithm begins with state 0 (DC coefficient). The cost of dropping all AC coefficients is stored in $J_0$. Then, one proceeds to state 1 (the first AC coefficient). There are ten paths to state 1 which all start from state 0. These ten paths correspond to the 10 size categories that the first AC index may fall into. The cost associated with each path is calculated using equation (13), where the first term in (13) is also pre-calculated, and $ID_i$ is determined as follows. For simplicity, we only consider positive indices here; negative indices are processed similarly by symmetry. Suppose $ID_i'$ is the output of the hard-decision quantizer with step size $q_i$ in response to the input $C_i$, and it falls into the category specified by s'. If s=s', $ID_i$ is chosen as $ID_i'$ since it results in the minimum distortion for $C_i$ in this size group. If s<s', $ID_i$ is chosen as the largest number in size group s since this largest number results in the minimum distortion in this group. Similarly, if s>s', $ID_i$ is chosen as the smallest number in size group s. After the ten incremental costs have been computed out, we can find the minimum cost to state 1 from state 0 and record this minimum cost as well as the run-size pair (r,s) which results in this minimum to state 1. Then, the cost of dropping all coefficients from 2 to 63 is added to the minimum cost of state 1. This sum is stored in $J_1$, which is the total minimum cost of this block when the first AC coefficient is the last nonzero coefficient to be sent. Proceeding to state 2, there are 110 paths to state 2 from state 0. Among them, ten paths go to state 2 from state 0 directly and 100 paths go to state 2 from state 0 through state 1 (10 times 10). The most efficient way of determining the best path that ends in state 2 is to use the dynamic programming algorithm. Since the minimum costs associated with ending at state 0 and state 1 are known, the job of finding the minimum cost path ending in state 2 is simply to find the minimum incremental costs of going from state 0 to state 2 and from state 1 to state 2. Add these two minimum incremental costs to the minimum costs of state 0 and 1 respectively; the smaller one between the two sums is the minimum cost of state 2. This minimum cost and the run-size pair (r,s) which results in this minimum cost are stored in state 2. Then, the cost of dropping all coefficients from 3 to 63 is added to the minimum cost of state 2. This sum is stored in $J_2$, which is the total minimum cost of this block when the second AC coefficient is the last nonzero coefficient to be sent. Note that, if the minimum path to state 2 is from state 0 directly, the stored r in the stored run-size pair (r,s) of state 2 is 1, which means the first AC is quantized or forced to zero. If the minimum path to state 2 is from state 1, the stored r is 0, which means the first AC index is nonzero. The recursion continues to the third coefficient and so on until the last coefficient at position 63 is done. At this point, we compare the values of $J_k$, k=0, 1, . . . 63, and find the minimum value, say, $J_k$ for some k*. By backtracking from k* with the help of the stored pairs (r,s) in each state, one can find the optimal path from state 0 to the end state with the minimum cost among all the possible paths, and hence the optimal sequence (R,S,ID) for the given 8×8 block. A pseudo-code of this algorithm is illustrated in FIGS. 6a, 6b and 6c.

The above procedure is a full dynamic programming method. To further reduce its computational complexity, we can modify it slightly. In particular, in practice, we do not have to compare the incremental costs among the 10 or 11 parallel transitions from one state to another state. Instead, it may be sufficient for us to compare only the incremental costs among the transitions associated with size group s−1, s, and s+1, where s is the size group corresponding to the output of the given hard-decision quantizer. Transitions associated with other groups most likely result in larger incremental costs. We shall compare the complexity and performance difference of these two schemes in the experimental results described below.

Optimal Quantization Table Updating

To update the quantization step sizes in Step 3), we need to solve the following minimization problem $$\min_Q d[I_0, (R, S, ID)_Q]$$

since the compression rate does not depend on Q once (R,S,ID) is given, where $I_0$ denotes the original input image to be compressed, and $Q=(q_0, q_1, \ldots, q_{63})$ represents a quantization table. Let $C_{i,j}$ denote the DCT coefficient of $I_0$ at the $i^{th}$ position in the zigzag order of the $j^{th}$ block. The sequence (R,S,ID) determines DCT indices, i.e., quantized DCT coefficients normalized by the quantization step sizes. Let $K_{i,j}$ denote the DCT index at the $i^{th}$ position in the zigzag order of the $j^{th}$ block obtained from (R,S,ID). Then the quantized DCT coefficient at the $i^{th}$ position in the zigzag order of the $j^{th}$ block is given by $K_{i,j}q_i$. With help of $C_{i,j}$ and $K_{i,j}q_i$, we can rewrite $d[I_0,(R,S,ID)_Q]$ as $$d[I_0, (R, S, ID)_Q] = \sum_{i=1}^{63} \sum_{j=1}^{Num\_Blk} (C_{i,j} - K_{i,j}q_i)^2 \quad (15)$$

where Num_Blk is the number of 8×8 blocks in the given image.

From (15), it follows that the minimization of $d[I_0,(R,S,ID)Q]$ can be achieved by minimizing independently the inner summation of (15) for each i=1, 2, . . . , 63. Our goal is to find a set of new quantization step size $\hat{q}_i (1 \le i \le 63)$ to minimize $$\min_{\hat{q}_i} \sum_{j=1}^{Num\_Blk} (C_{i,j} - K_{i,j}\hat{q}_i)^2, i = 1, \ldots, 63 \quad (16)$$

Equation (16) can be written as $$\min_{\hat{q}_i} \sum_{j=1}^{Num\_Blk} C_{i,j}^2 - 2C_{i,j}K_{i,j}\hat{q}_i + K_{i,j}^2\hat{q}_i^2, i = 1, \ldots, 63 \quad (17)$$

The minimization of these quadratic functions can be evaluated by taking the derivative of (17) with respect to $\hat{q}_i$. The minimum of (16) is obtained when $$q = \frac{\sum_{j=1}^{Num\_Blk} C_{i,j} \cdot K_{i,j}}{\sum_{j=1}^{Num\_Blk} K_{i,j}^2}, i = 1, \ldots, 63 \quad (18)$$

The step sizes in Step 3) can be updated accordingly.

Trellis-Based DC Optimization

In this section, we consider the joint optimization of the quantized DC coefficients with the quantization step size and Huffman table. In JPEG syntax, the quantized DC coefficients are coded differentially, using a one-dimensional predictor, which is the previous quantized DC value. Since the cost of encoding a quantized DC coefficient only depends on the previous quantized DC coefficient, a trellis can be used in the joint optimization.

Figure 5:
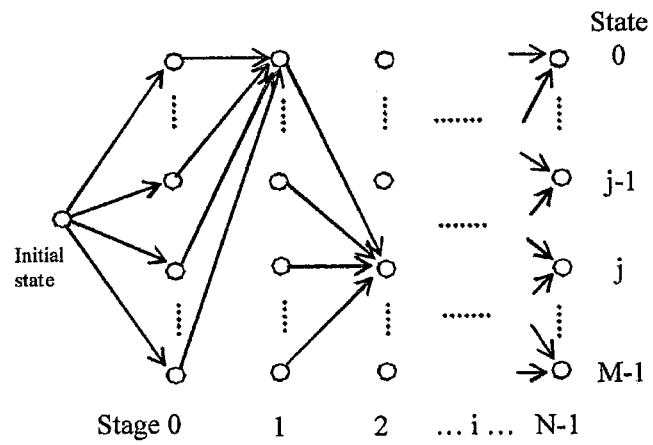
FIG. 5 illustrates a trellis structure for representing distinct values a DC index can take for a sequence of n coefficients in accordance with a further aspect of the present invention.

Let us define a trellis with N stages, which correspond to the number of DC coefficients, i.e., the number of 8×8 blocks in a restart interval (the DC coefficient prediction is initialized to 0 at the beginning of each restart interval and each scan—see reference [1]). Each stage has M states, which correspond to the distinct values a DC index can take, and states in adjacent stages are fully connected, as shown in FIG. 5. Every state in each stage is associated with a cost which is the minimum cost to this state from the initial state. The process of finding the optimal DC index sequence starts from stage 0 until stage N−1. At stage N−1, the state with the minimum cost is sorted out and the optimal path from stage 0 to stage N−1 with the minimum cost is traced out backward, yielding the optimal DC index sequence.

A more elaborate step-by-step description of the process follows. Let $x(i,j)$ denote the $j^{th}$ state in stage i ($0 \le i \le N-1$, $0 \le j \le M-1$) and $v(i,j)$ represent the DC index value corresponding to $x(i,j)$. Let cost_mini $(i,j)$ denote the minimum cost to $x(i,j)$ from the initial state. Let cost_inc $(i-1,j,i,j)$ represent the incremental cost from $x(i-1,j)$ to $x(i,j)$, which is defined as $$\text{cost\_inc}(i-1,j',i,j) = |DC_i - q_0 \cdot v(i,j)|^2 + \lambda \cdot (-\log_2 P(S) + S) \quad (19)$$

where $q_0$ is the quantization step size for DC coefficients, $DC_i$ is the $i^{th}$ DC coefficient, S is the group category of the difference $|v(i,j)-v(i-1,j')|$ and $P(S)$ is its probability among the 12 size categories ($0 \le S \le 11$). The cost associated with the initial state is set to zero. We start from stage 0. Since each state only has one incoming path, the cost to each state in stage 0 is the incremental cost from the initial state. Then, we proceed to stage 1 and start with state 0. There are M incoming paths to $x(1,0)$ from $x(0,j')(0 \le j \le M-1)$. The M incremental costs (i.e., cost_inc $(0,j',1,0)$ are calculated using equation (19) and these M incremental costs are added to the M minimum costs associated with the M states at stage 0, respectively. The minimum is sorted out and recorded as cost_mini (1,0) for state $x(1,0)$. The optimal predecessor is also recorded for the purpose of backtracking. In the same manner, we need to find cost_mini $(1,j)(1 \le j \le M-1)$ and the optimal predecessors for other M−1 states in stage 1. This procedure continues to stage 2 and so on until stage N−1. At this point, we can find j* with the smallest cost_mini (N−1,j) for $0 \le j \le M-1$. This cost-mini (N−1,j*) is the minimum cost of the optimal path from the initial state to stage N−1. By backtracking from j* with the help of the stored optimal predecessor in each state, one can find the optimal path from the initial state to stage N−1, hence, the optimal DC index sequence.

After the optimal sequence of DC indices is obtained, we may update P(S) and the quantization step size $q_0$ in the same manner as discussed above. Then the optimization process is iterated as we did for the joint optimization of the quantized AC coefficients with the quantization step size and Huffman table.

A DC index can take up to 2047 different values (−1023 to 1023) in baseline JPEG, which requires 2047 states in each stage. This large number of states not only increases the complexity of the above algorithm but also demands plenty of storage locations. In practice, if a DC coefficient is soft-quantized to a value that is far from the output of a hard-decision quantizer, it most likely results in a higher cost path. Therefore, in the real implementation of the trellis-based DC optimization, we may only set a small number of states which correspond to the DC indices that are around the output of a hard-decision quantizer. For example, we may only use 33 states in each stage with the middle state corresponding to the output of a hard-decision quantizer, and the upper and lower 16 states respectively corresponding to the 16 neighboring indices that are larger or smaller than the output of the hard-decision quantizer. This reduces the computation complexity and memory requirement significantly with only a slight degradation of the performance.

Figure 7:
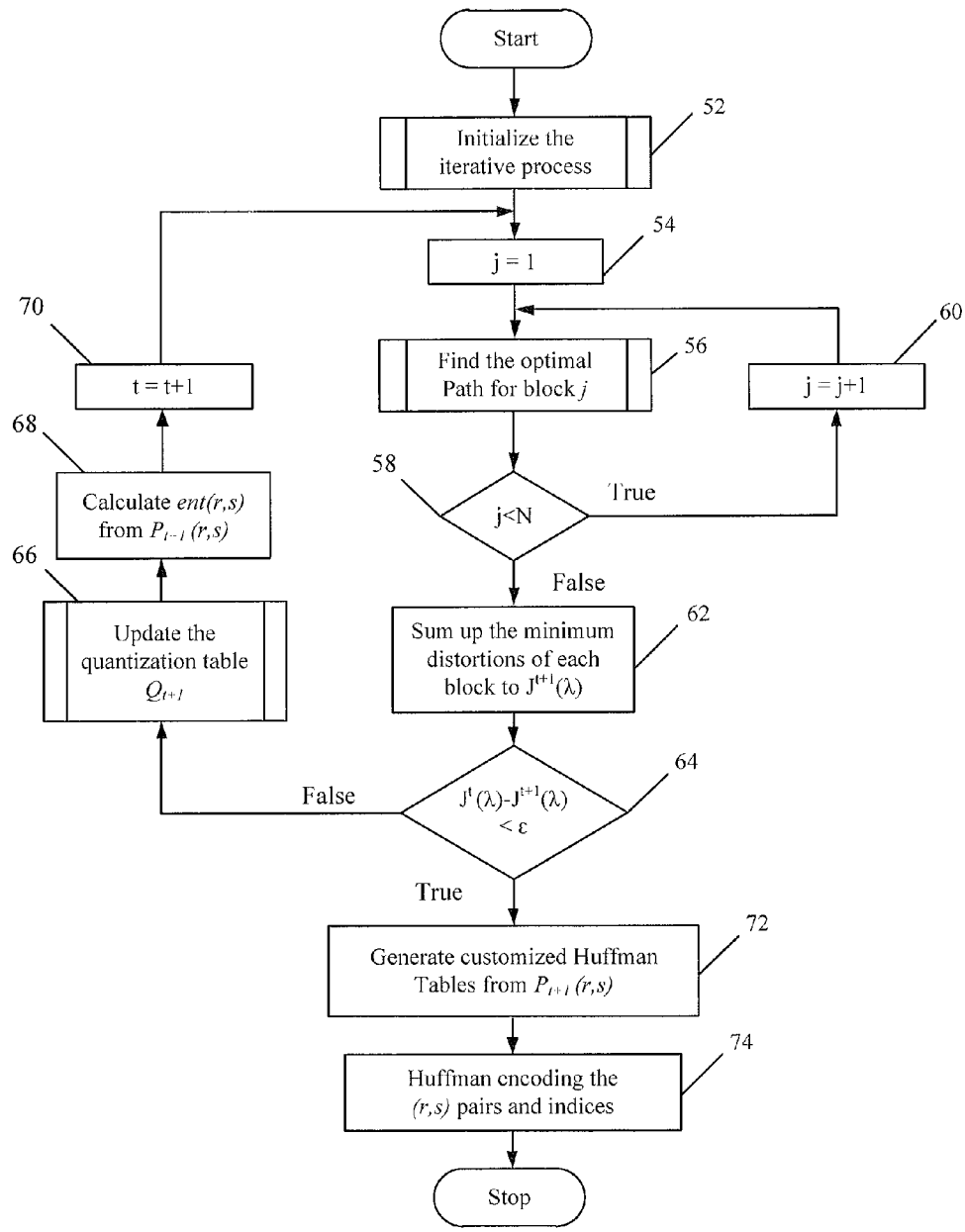
FIG. 7, in a flowchart, illustrates a process for jointly optimizing run-length coding, Huffman coding and quantization table in accordance with an aspect of the present invention.

A process for jointly optimizing the run-length coding, Huffman coding and quantization table in accordance with an aspect of the invention is shown in the flowchart of FIG. 7. At step 52, the iterative process is initialized, as outlined in detail in the flowchart of FIG. 8. At step 54, j, the index representing the $j^{th}$ block of N total blocks is set to 1. At step 56, the process determines the optimal path for block j, in this case, the first block. This is outlined in detail in the flowchart of FIG. 9. At query 58, it is determined whether j is the final block. This is achieved by comparing j to N (the total number of blocks). Where j is less than N, j is incremented in step 60.

The process of finding the optimal path for each block j continues until j=N. When j=N, an optimal path for each of the N blocks will have been determined. The $(t+1)^{th}$ value of $J(\lambda)$ is computed in step 62 as the sum of the minimum distortions associated with each of the N blocks. This value is then compared against the $t^{th}$ value of $J(\lambda)$ in query 64. Where the difference between the $t^{th}$ value of $J(\lambda)$ and the $(t+1)^{th}$ value of $J(\lambda)$ is less than $\epsilon$ (the selection criterion, or more specifically, the convergence criterion), the optimization is considered complete. Where this is not the case, the joint optimization process moves to step 66 and quantization table $Q_{t+1}$ is updated, as outlined in detail in the flowchart of FIG. 12.

At step 68, the $(t+1)^{th}$ probability distribution function is used to calculate the entropy rate associated with run-size pair (r,s). At step 70, index t is incremented and an additional iteration is subsequently performed. Where it was determined that the selection criterion was satisfied in query 64, the $(t+1)^{th}$ probability distribution function associated with run-size pair (r,s) is used to generate customized Huffman tables in step 72. Step 74 uses these customized Huffman tables to encode the run-size pairs and indices. The process for jointly optimizing the run-length coding, Huffman coding and quantization table are complete.

Figure 8:
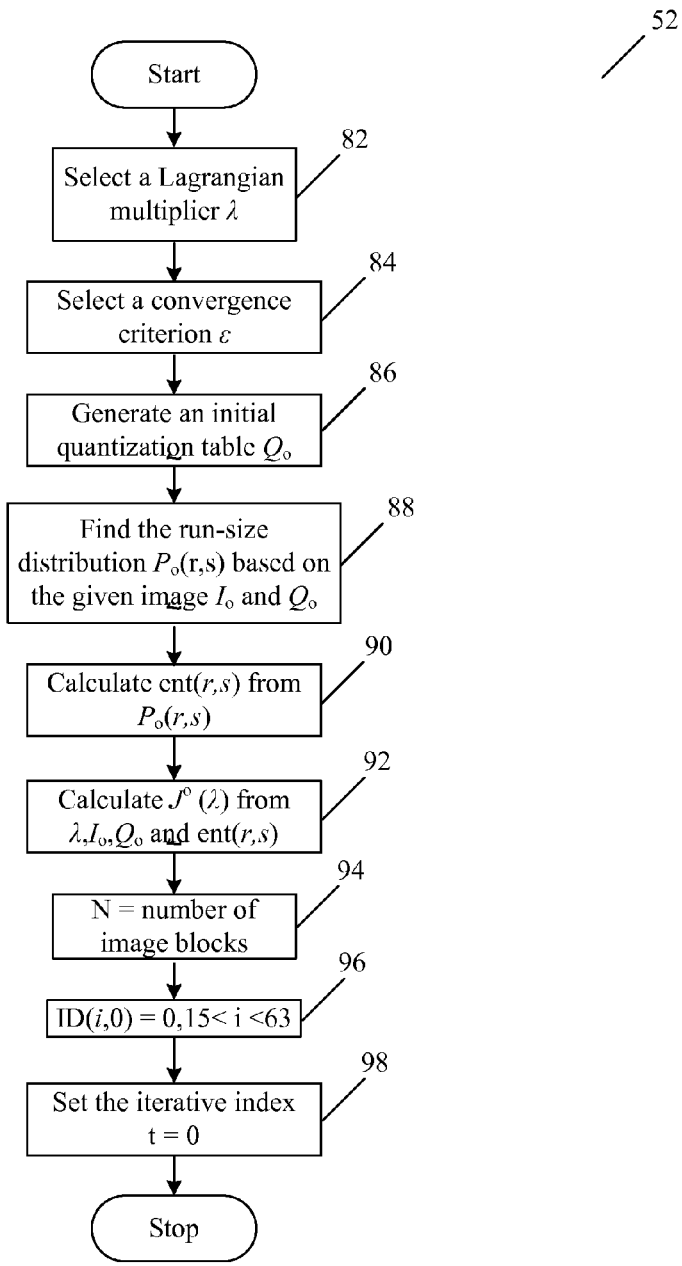
FIG. 8, in a flowchart, illustrates an initialization of an iterative process of the process of FIG. 7.

Referring now to the flowchart of FIG. 8, the initialization of the iterative process in step 52 of the flowchart of FIG. 7 is described in more detail. At step 82, a Lagrangian multiplier, $\lambda$, is selected. This is a fixed parameter that represents the trade off of rate for distortion. At step 84, the convergence criterion $\epsilon$ is selected. This is the amount by which the difference of the Lagrangian costs, $J^t(\lambda)$, of successive iterations must be below for the iteration to be deemed successful and complete.

In step 86, an initial quantization table $Q_0$ is generated. Step 88 uses the given image $I_0$ and the quantization table $Q_0$ generated in the previous step to determine the run-size distribution $P_0(r,s)$. At step 90, this run-size distribution is then used to calculate the entropy rate associated with the run-size pair (r,s). At step 92, the initial Lagrangian cost $J^0(\lambda)$ is calculated based on the original DCT coefficients and the Lagrangian multiplier $\lambda$, the quantization table $Q_0$, and the entropy rate associated with run-size pair (r,s). At step 94, N is set to be equal to the number of image blocks and at step 96, ID(i,0), the index to be sent for the $i^{th}$ DCT coefficient when the index is forced to size group 0, for 15<i<63, is set to 0.

Finally, at step 98, the iterative index t is set equal to 0 and the process of initializing the iterative process is complete.

Figure 9:
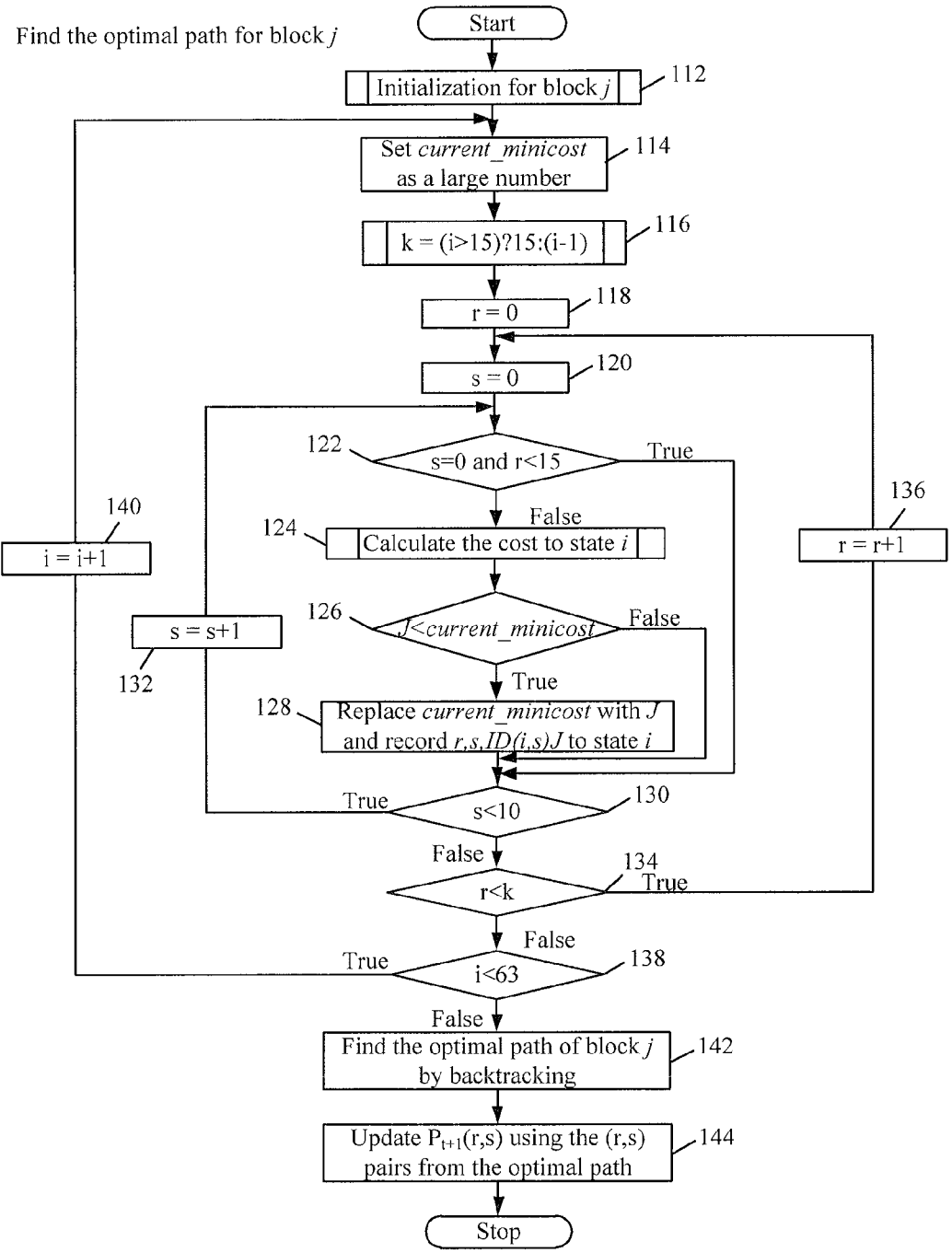
FIG. 9, in a flowchart, illustrates a process for determining an optimal path for a particular block in the process of FIG. 7.

Referring now to the flowchart of FIG. 9, the process for determining the optimal path for block j of step 56 in the flowchart of FIG. 7 is described in more detail. At step 112, block j is initialized, as outlined in detail in the flowchart of FIG. 10. At step 114, current_minicost, the variable that stores the current lowest Lagrangian cost to state i for block j is set to a large number. At step 116, variable k is assigned a value to represent the number of incoming connections from previous states. Where i>15, k is assigned a value of 15. Where i≤15, k=i−1. At step 118, r, the variable associated with run, is set equal to 0 and at step 120, s, the variable associated with size group, is set to 0.

At query 122, the process determines whether both of the relations s=0 and r<15 are true. Where this is not the case, the cost to state i is calculated in step 124, as outlined in more detail in the flowchart of FIG. 11. At query 126, the cost to state i is compared to the current minimum cost, current_minicost. Where J, the cost to state i is less than current_minicost, current_minicost is replaced with J and the variables r, s, id(i,s) and J are stored to state i in step 128.

From step 128, as well as from query 126 when the current cost was not less than current_minicost and from query 122 when it was found that s=0 and r<15 held true, the process proceeds to query 130, which asks whether is less than 10. Where s<10, s is incremented at step 132 and the iteration associated with calculating the cost to state i is repeated with the updated variables. Where s≥10 in query 130, query 134 asks whether r is less than k. Where r<k, r is incremented at step 136, s is reset to 0 at 120 and the iteration for calculating the cost to state i is repeated. However, where r is not less than k, query 138 asks whether i is less than 63. Where this is the case, i is incremented at step 140 and the entire iteration is repeated. Where i is not less than 63, all of the costs are deemed to have been calculated and the optimal path of block j is determined by backtracking in step 142. At step 144, the run-size pairs (r,s) from the optimal path are used to update the run-size probability distribution function $P_{t+1}(r,s)$ and the process for finding the optimal path for block j is complete.

Figure 10:
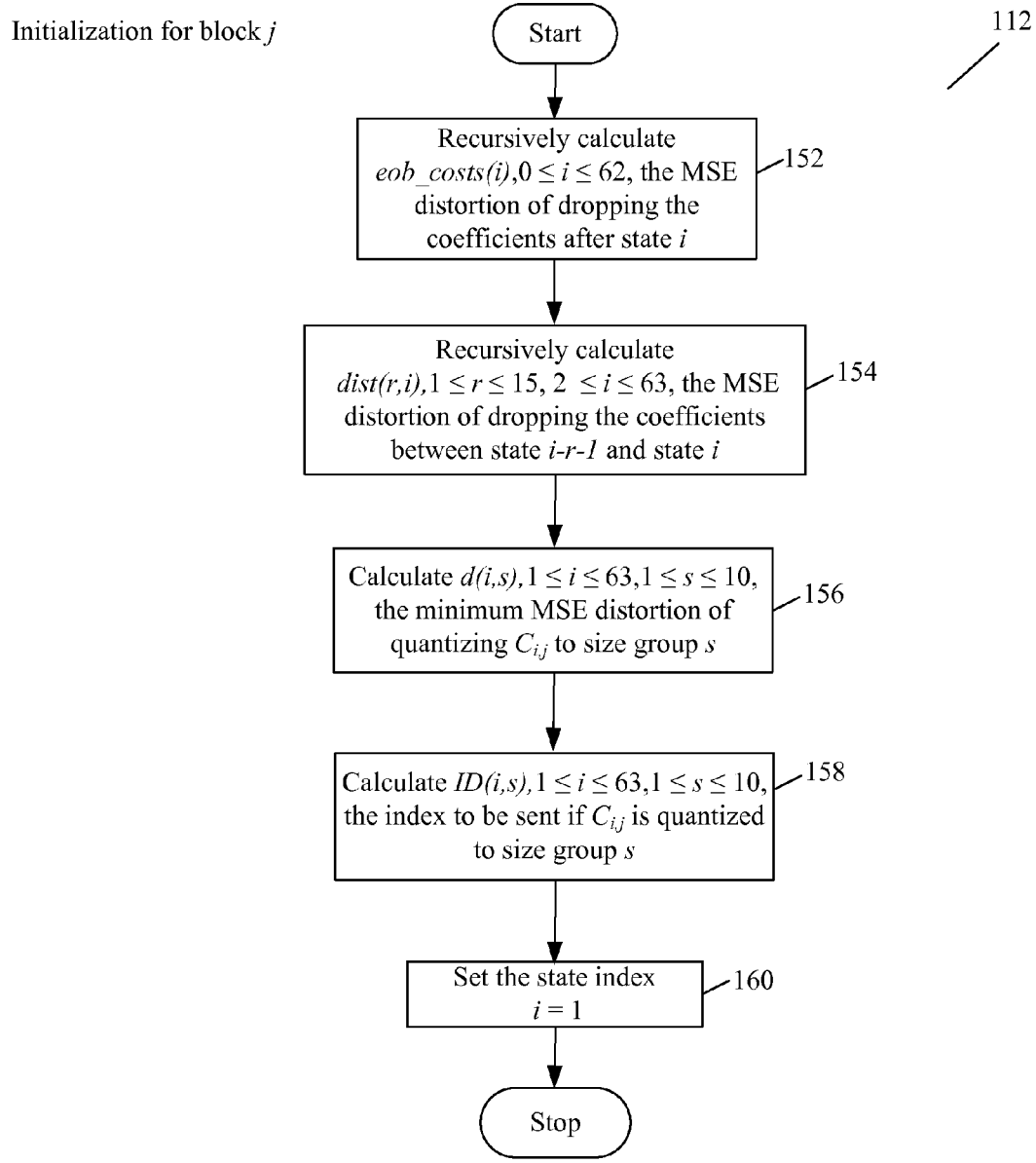
FIG. 10, in a flowchart, illustrates a block initializing process invoked by the optimal path determination process of FIG. 9.

Referring now to the flowchart of FIG. 10, the initialization for block j of step 112 of the flowchart of FIG. 9 is described in more detail. In step 152, the end of block cost, eob_cost(i) is recursively calculated for 0≤i≤62. This corresponds with the cost of dropping all of the coefficients after state i. At step 154, the distortion, dist(r,i) is recursively calculated for 1≤r≤15 and 2≤i≤63. This refers to the mean square distortion (MSE) of dropping all of the coefficients between state i−r−1 and state i.

At step 156, a second distortion metric, d(i,s) is calculated for 1≤i≤63 and 1≤s≤10. This is the mean square distortion (MSE) resulting from the $i^{th}$ DCT coefficient (1≤i≤63) when the corresponding index is forced into size group s. At step 158, the index to be sent for the $i^{th}$ DCT coefficient when the index is in size group s, id(i,s), is calculated for 1≤i≤63 and 1≤s≤10. Finally, at step 160, the state index i is set equal to 1 and the initialization for block j is complete.

Figure 11:
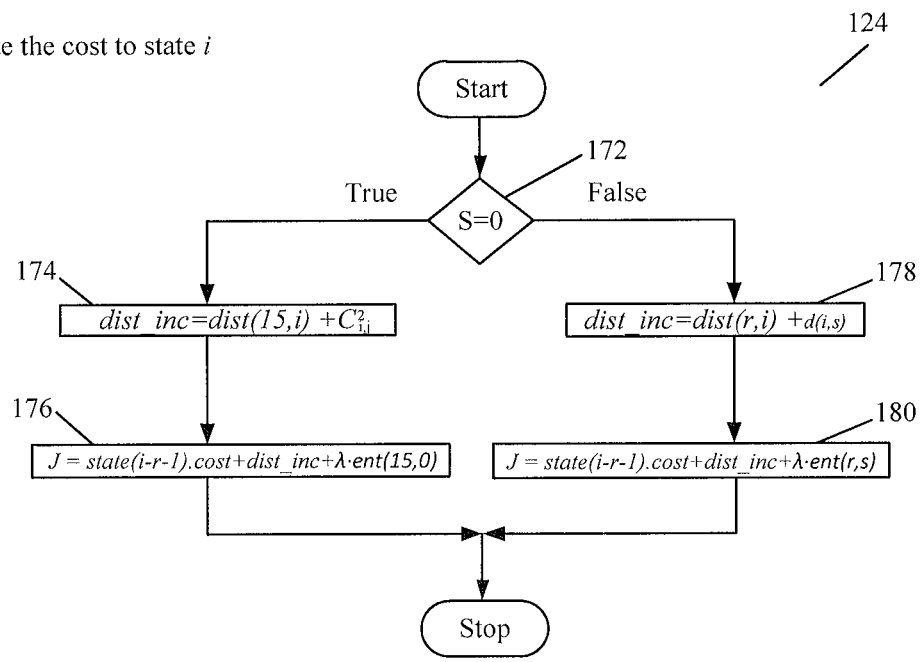
FIG. 11, in a flowchart, illustrates a incremental cost calculating process invoked by the process of FIG. 9.

Referring now to the flowchart of FIG. 11, the procedure for calculating the cost to state i, step 124 of the flowchart of FIG. 9 is described in detail. Query 172 asks whether s is equal to 0. Where this is found to be true, step 174 determines the incremental distortion from state i−r−1 (where r=15) to state i as the sum of the mean square distortion of dropping all of the coefficients between state i−16 and i, and the mean square distortion of dropping the $i^{th}$ DCT coefficient in the current block. Then, the cost to state i, is computed in step 176 as the sum of the cost to state i−r−1, the incremental distortion from state i−r−1 to state i and the entropy rate associated with the run size pair (15,0) scaled by λ.

Where s was not equal to 0 at query 172, the incremental distortion is computed in step 178 as the sum of the mean square distortion of dropping all of the coefficients between state i−r−1 and state i and the mean square distortion resulting from the $i^{th}$ DCT coefficient when the corresponding index if forced into size group s. The cost to state i is then computed in step 180 as the sum of the cost to state i−r−1, plus the incremental distortion from state i−r−1 to state i, plus the entropy rate associated with the run size pair (r,s) scaled by λ. When the cost for the iteration has been computed in either step 176 or step 180, the cost to state i calculation is complete.

Figure 12:
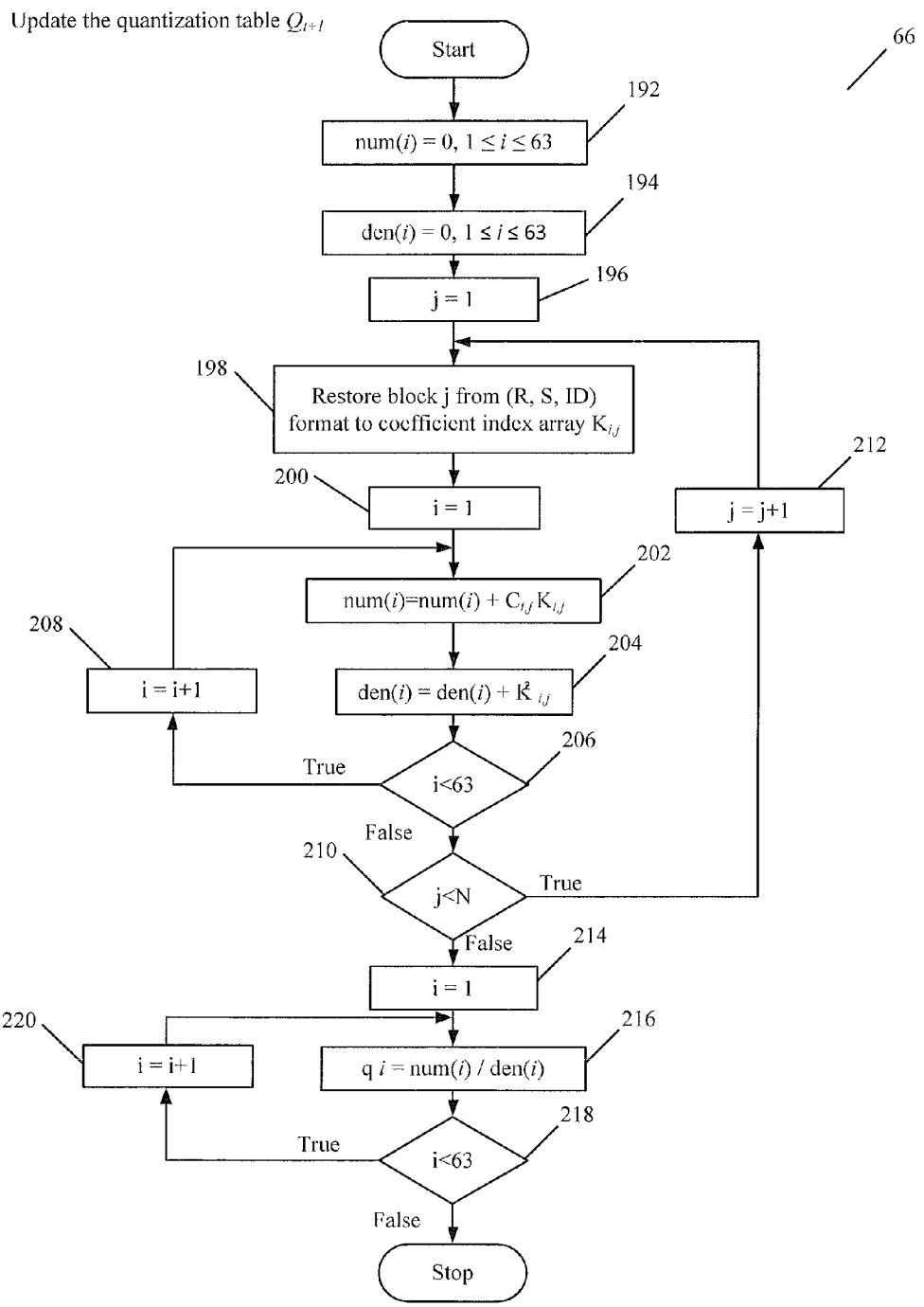
FIG. 12, in a flowchart, illustrates a process for updating a quantization table invoked by the process of FIG. 7.

Referring now to the flowchart of FIG. 12, the process for updating the quantization table $Q_{t+1}$, step 66 of the flowchart of FIG. 7, is described in detail. In step 192, a numerator array, num(i) is initialized to 0 for 1≤i≤63. Similarly, in step 194, a denominator array, den(i) is also initialized to 0 for 1≤i≤63. In step 196, the block index j is initialized to 1. At step 198, block j is restored from its run-size and indices format to create coefficient index array $K_{i,j}$. At step 200, index i, representing the position in the zig-zag order of the $j^{th}$ block is set to 1.

In step 202, the $i^{th}$ value in the numerator array is computed as the sum of its current value and the product of the original $i^{th}$ DCT coefficient of the $j^{th}$ block and the restored DCT index at the $i^{th}$ position in the zig-zag order of the $j^{th}$ block, as determined in step 198, from the run-size and indices format. In step 204, the $i^{th}$ value in the denominator array is computed as the sum of its current value and the square of the DCT index at the $i^{th}$ position in the zig-zag order of the $j^{th}$ block.

Query 206 asks whether i is less than 63. Where i<63, i is incremented at step 208 and the numerator and denominator values associated with the new i are computed. Where i is not less than 63 in query 206, query 210 asks whether j is less than N, the total number of blocks. If j<N, j is incremented in step 212 and the numerator and denominator computations are performed based on the next block. Otherwise step 214 sets i equal to 1.

In step 216, the value associated with the $i^{th}$ position in the zig-zag order of quantization table $Q_{t+1}$, $q_i$, is computed as the value of the numerator over the denominator at position i. Query 218 asks whether i is less than 63. Where this is true, i is incremented at step 220 and the remaining positions in the quantization table are computed. Otherwise, the updating of $Q_{t+1}$ is complete.

Figure 13:
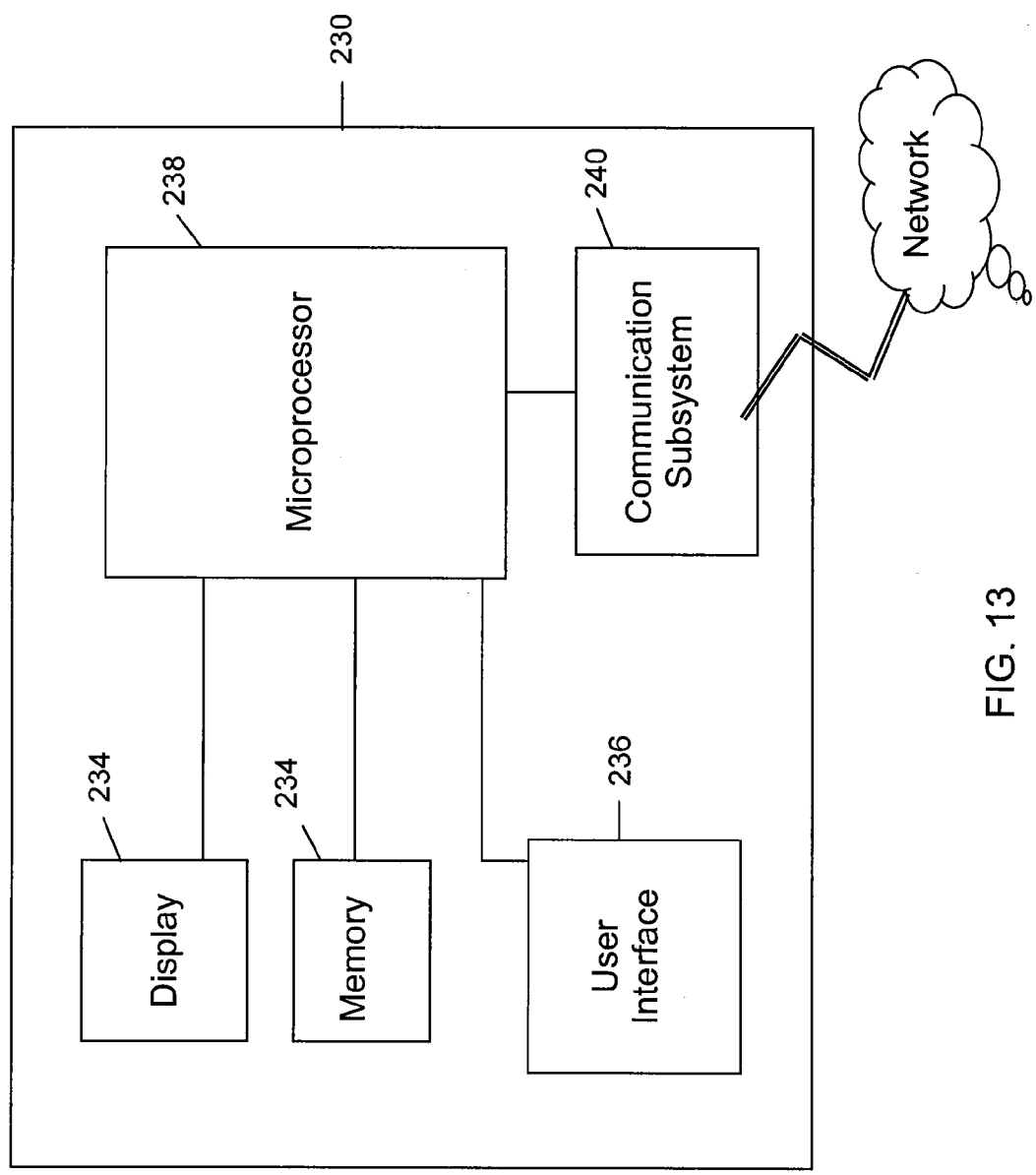
FIG. 13, in a block diagram, illustrates a data processing system in accordance with an aspect of the present invention.

Referring to FIG. 13, there is illustrated in a block diagram a data processing system 230 for implementing compression methods such as those described above in connection with FIGS. 7-12 in accordance with the preferred aspect of the invention. As shown, the system 230 comprises a display 232 for displaying, for example, images to be transmitted. Similarly, the memory 234 may include JPEG or MPEG files to be transmitted. On receiving instructions from a user via a user interface 236, a microprocessor 238 compresses the input image data in the manner described above using a calculation module and initialization module (not shown), before providing the compressed data to a communication subsystem 240. The communication subsystem 240 may then transmit this compressed data to network 242.

As described above, the system 240 may be incorporated into a digital camera or cell phone, while the mode of transmission from communication subsystem 240 to network 242 may be wireless or over a phone line, as well as by higher band width connection.

Experimental Results

Optimization of AC Coefficients

Figure 14:
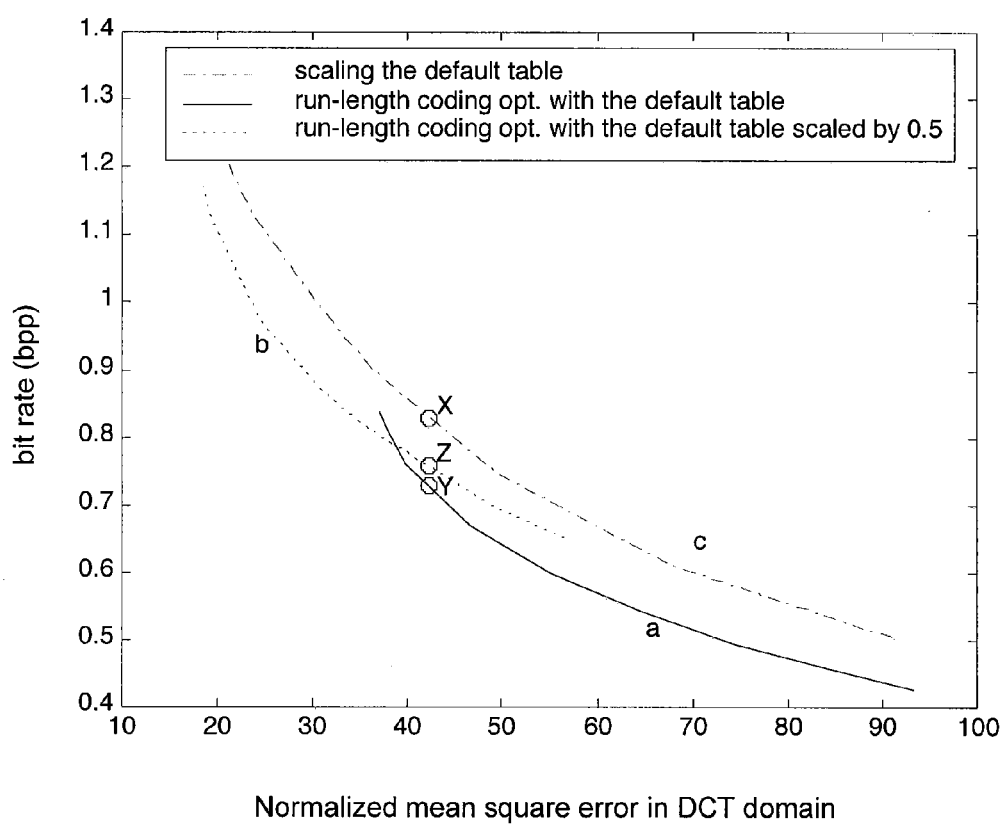
FIG. 14, in a graph, illustrates rate-distortion curves for different quantization tables.

The graph-based run-length coding optimization algorithm and the iterative joint optimization algorithm described above can be applied to the JPEG and MPEG coding environment for decoder compatible optimization. Both of them start with a given quantization table. Since the quantization step size updating algorithm discussed above only achieves local optimality, the initial scaling of the default quantization table has a direct influence on the R-D performance if a default quantization table has to be used. As an example, FIG. 14 illustrates this influence for 512×512 Barbara image using our graph-based run-length coding optimization method. Curve "a" corresponds to the default quantization table while curve "b" corresponds to a fine scale of 0.5 (i.e., halve the length of all the step sizes). The curves are obtained by sweeping the Lagrange multiplier $\lambda$ through all positive values in interest. For the purpose of comparison, the R-D curve obtained by scaling the quantization table only is also given as curve "c". It can be seen that we may achieve the same distortion of point X from curve "a" or curve "b". From curve "a", we use a small $\lambda$ to get point Y. ($\lambda$ is placed before the rate in the implementation to reduce the complexity since it can be pre-multiplied to the entropy rate; $-1/\lambda$ has the physical meaning of the slope on the R-D curve.) From curve "b", we use a comparatively large $\lambda$ to get point Z. Even though a binary-search method can be used to find the optimal initial scaling factor in the R-D sense, a scale determined empirically works fine and achieves most of the gain that can be obtained by the optimization scheme. The empirical method is used in our experiments.

Figure 15:
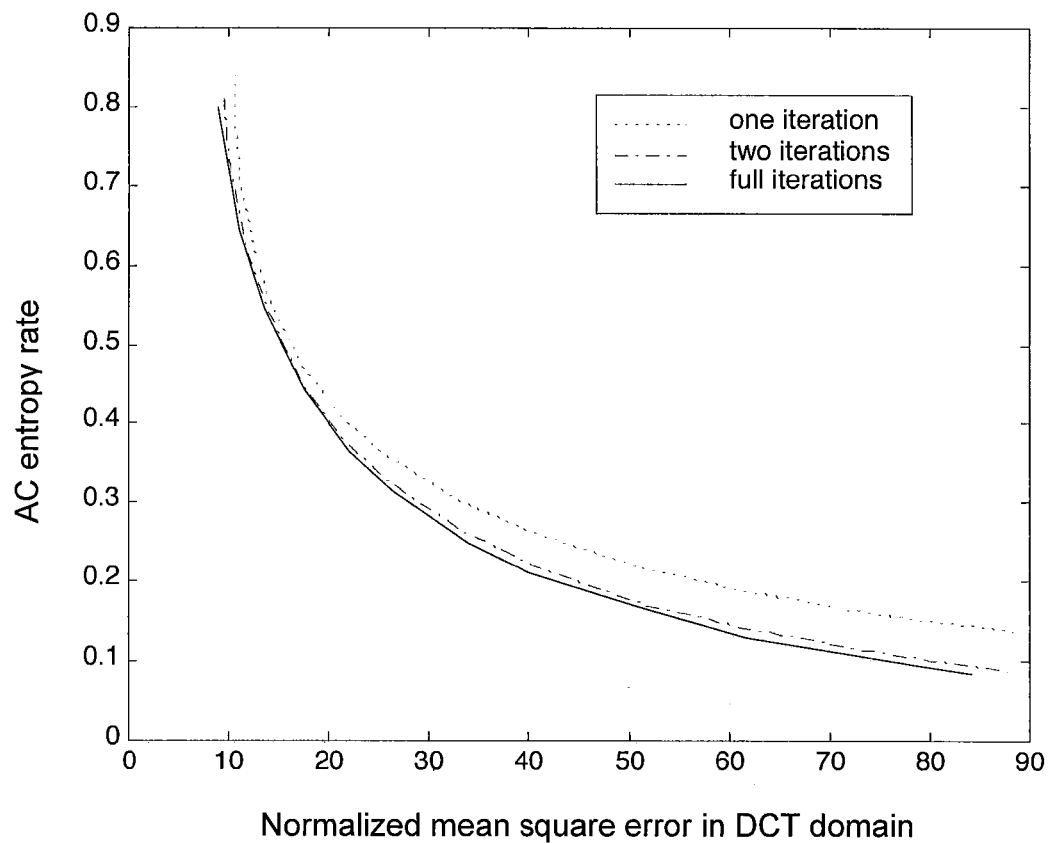
FIG. 15 is a graph showing rate-distortion curves reflecting a different number of iterations of an iterative joint optimization algorithm in accordance with an aspect of the invention.

Given the initial quantization table, the number of iterations in the iterative joint optimization algorithm also has a direct impact on the computation complexity and resulting compression performance. FIG. 15 compares the R-D curves obtained from one iteration (optimizing the run-size pairs only), two iterations, and full iterations (the convergence tolerance $\epsilon$ is set as 0.1 and the resulting average number of iterations is around 6) for 512×512 Lena image. It can be seen that most of the gain achievable from the full joint optimization is obtained within two iterations.

Figure 16:
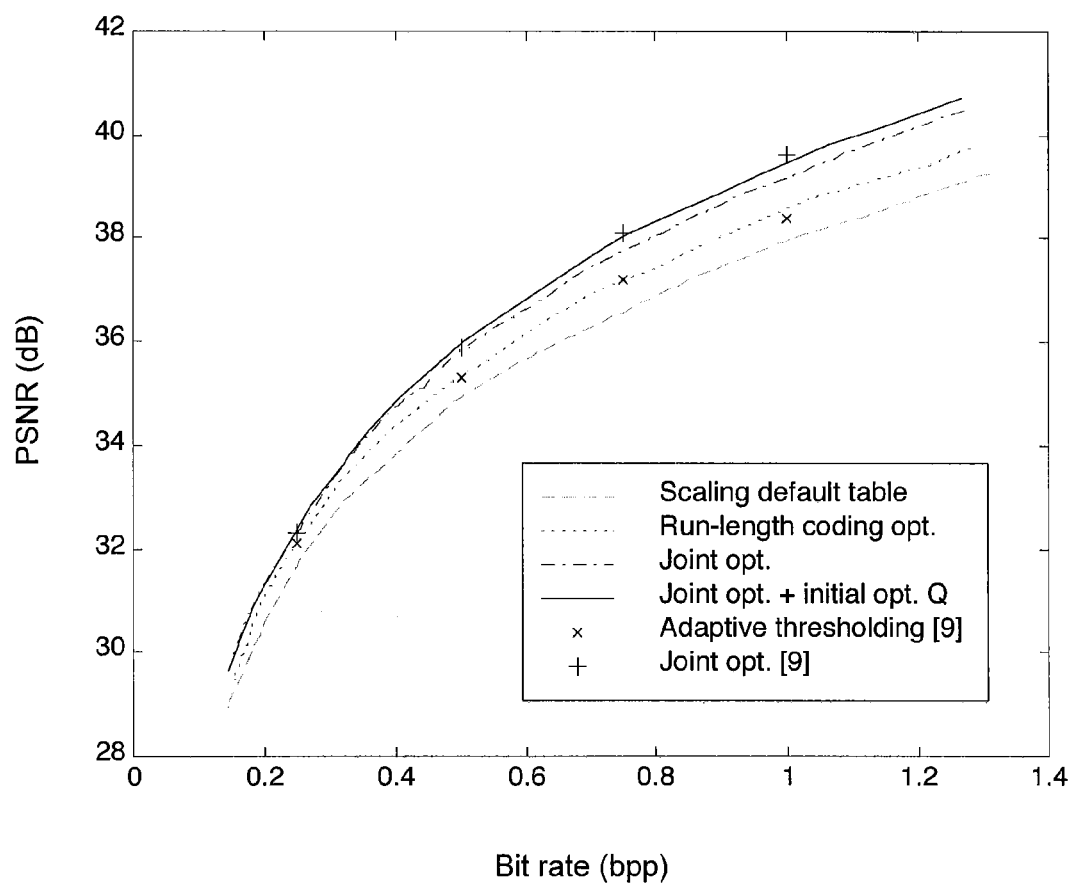
FIG. 16 plots rate-distortion curves of different configurations of optimization methods in accordance with different aspects of the present invention applied to a 512×512 Lena image.
Figure 17:
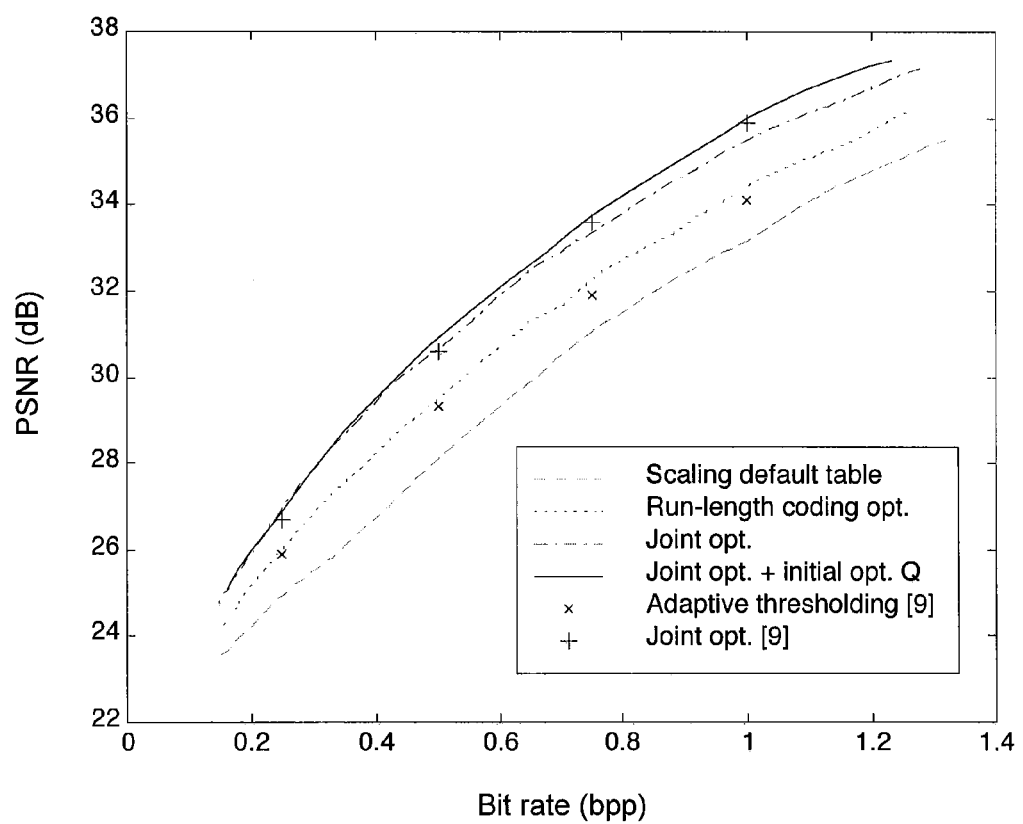
FIG. 17 plots rate-distortion curves of different configurations of optimization methods in accordance with different aspects of the present invention applied to a 512×512 Barbara image.

As mentioned above, the quantization step size updating algorithm only achieves local optimality. In addition to a scaled default quantization table, the proposed joint optimization algorithm can also be easily configured to start with any other quantization table such as one obtained from any schemes in references [3]-[5]. (It should be pointed out that schemes proposed in references [3]-[5] address only how to design optimal quantization tables for hard decision quantization; as such, quantization tables obtained from these schemes are not optimal for soft decision quantization we consider in this paper. Nonetheless, as an initial quantization table for our iterative joint optimization algorithm, these quantization tables are better than a scaled default quantization table.) In our experiments, we choose the fast algorithm in reference [5] to generate an initial quantization table to start with. FIG. 16 and Table I compare the Peak Signal-to-Noise Ratio (PSNR) performance of different configurations of our optimization methods as well as the reference methods for 512×512 Lena image. FIG. 17 and Table II compare the same performance for 512×512 Barbara image. A customized Huffman table is used in the last entropy encoding stage. Several remarks are in order. First, the optimal adaptive thresholding scheme in references [7] and [9] is a subset of the proposed run-length coding optimization. Therefore, the proposed run-length coding optimization scheme outperforms the optimal adaptive thresholding scheme for both images under any bit rates as we expected. Second, quantization table optimization plays a less important role at low bit rates since more coefficients are quantized to zero at low bit rates. The proposed joint optimization scheme with an initial scaled default quantization table achieves better results than the joint optimization scheme in reference [9] at low bit rate(s). Third, for complicated images like Barbara, since there are more nonzero coefficient indices that can be optimized on, the proposed joint optimization algorithm with an initial quantization table generated from the scheme of reference [5] outperforms the joint optimization scheme in reference [9] for all bit rates under comparison. For simple images like Lena, the proposed joint optimization algorithm still achieves better results than the scheme in reference [9] at low bit rates since quantization table optimization plays a less important role at low bit rates. However, the scheme in reference [9] still achieves better results at high bit rates for image Lena because our method does not find the optimal quantization step sizes exhaustively in each iteration. Fourth, the proposed joint optimization algorithm improves the objective PSNR significantly, as compared to the customized baseline JPEG, to the extent that the performance even exceeds the quoted PSNR results of some state-of-the-art wavelet-based image coders like Shapiro's embedded zerotree wavelet algorithm in J. Shapiro, "Embedded image coding using zerotrees of wavelet coefficients," IEEE Trans. Signal Processing, vol. 41, pp. 3445-3462, December 1993 (hereinafter "reference [13]") for some complicated image like Barbara at the bit rates under comparison. Table III and IV tabulate the PSNR results of the proposed optimization algorithms for two more images (512×512 Mandrill and Goldhill).

TABLE I

Comparison of PSNR with different optimization methods (512 × 512 Lena)

| Rate (bpp) | Customized baseline | Adaptive threshold [9] | Run-length coding optimization | Joint opt. + initial scaled default q-table | Joint opt. + initial q-table from [5] | Joint optimization [9] | Baseline wavelet transform coder [12] | Embedded zerotree wavelet algorithm [13] |
|---|---|---|---|---|---|---|---|---|
| .25 | 31.64 | 32.1 | 32.19 | 32.39 | 32.45 | 32.3 | 33.17 | 33.17 |
| .50 | 34.90 | 35.3 | 35.38 | 35.74 | 35.99 | 35.9 | 36.18 | 36.28 |
| .75 | 36.56 | 37.2 | 37.25 | 37.59 | 38.05 | 38.1 | 38.02 | N/A |
| 1.00 | 37.94 | 38.4 | 38.58 | 39.12 | 39.50 | 39.6 | 39.42 | 39.55 |

TABLE II

Comparison of PSNR with different optimization methods (512 × 512 Barbara)

| Rate (bpp) | Customized baseline | Adaptive threshold [9] | Run-length coding optimization | Joint opt. + initial scaled default q-table | Joint opt. + initial q-table from [5] | Joint optimization [9] | Baseline wavelet transform coder [12] | Embedded zerotree wavelet algorithm [13] |
|---|---|---|---|---|---|---|---|---|
| .25 | 24.95 | 25.9 | 26.01 | 26.91 | 27.00 | 26.7 | 26.64 | 26.77 |
| .50 | 28.10 | 29.3 | 29.49 | 30.63 | 30.90 | 30.6 | 29.54 | 30.53 |
| .75 | 31.02 | 31.9 | 32.23 | 33.13 | 33.79 | 33.6 | 32.55 | N/A |
| 1.00 | 33.16 | 34.1 | 34.41 | 35.22 | 36.01 | 35.9 | 34.56 | 35.14 |

TABLE III

PSNR results of 512 × 512 Mandrill

| Rate (bpp) | Customized baseline | Run-length coding optimization | Joint opt. + initial scaled default q-table | Joint opt. + initial q-table from [5] | Baseline wavelet transform coder [12] |
|---|---|---|---|---|---|
| .25 | 22.31 | 22.70 | 22.92 | 22.95 | 22.87 |
| .50 | 24.17 | 24.59 | 25.25 | 25.33 | 25.04 |
| .75 | 25.52 | 26.05 | 27.11 | 27.22 | 26.95 |
| 1.00 | 26.67 | 27.38 | 28.48 | 28.85 | 28.45 |

TABLE IV

PSNR results of 512 × 512 Goldhill

| Rate (bpp) | Customized baseline | Run-length coding optimization | Joint opt. + initial scaled default q-table | Joint opt. + initial q-table from [5] | Baseline wavelet transform coder [12] |
|---|---|---|---|---|---|
| .25 | 29.30 | 29.72 | 29.97 | 30.00 | 30.08 |
| .50 | 31.72 | 32.15 | 32.50 | 32.64 | 32.62 |
| .75 | 33.26 | 33.73 | 34.28 | 34.52 | 34.42 |
| 1.00 | 34.55 | 35.05 | 35.83 | 36.05 | 35.94 |

Computational Complexity

We now present some computational complexity results of the run-length coding optimization algorithm and the iterative joint optimization algorithm. As mentioned above, given a state and a predecessor, we may find the minimum incremental cost by comparing all the 10 size groups or 3 size groups (i.e., the size group from the hard-decision quantizer and its two neighboring groups). Our experiments show that these two schemes achieve the same performance in the region of interest. Only when λ is extremely large, we see that the results of comparing 10 size groups slightly outperform the results of comparing 3 size groups. In practice, however, these large values of λ will not be used since they lead to large distortions or unacceptably poor image quality. Therefore, all the experimental results in this paper are obtained by comparing 3 size groups. Table V tabulates the CPU time for the C code implementation of the proposed iterative joint optimization algorithm on a Pentium PC with one iteration with 512×512 Lena image. It can be seen that our algorithms are very efficient compared to the schemes in references [7] and [9](the fast thresholding algorithm in reference [7] takes around 6.1 seconds for one iteration and the scheme in reference [9] takes several dozens of seconds for one iteration on a SPARC-II workstation with a 512×512 image). When the proposed iterative joint optimization algorithm is applied to web image acceleration, it takes around 0.2 seconds to optimize a typical size (300×200) JPEG color image with 2 iterations.

TABLE V

CPU time of the proposed joint optimization algorithm with one iteration on a Pentium PC (512 × 512 Lena)

| Settings | Float DCT | Fast integer DCT |
|---|---|---|
| Comparing 3 size groups | 1.5 s | 0.3 s |
| Comparing 10 size groups | 2.0 s | 0.7 s |

Optimization of DC Coefficients

Figure 18:
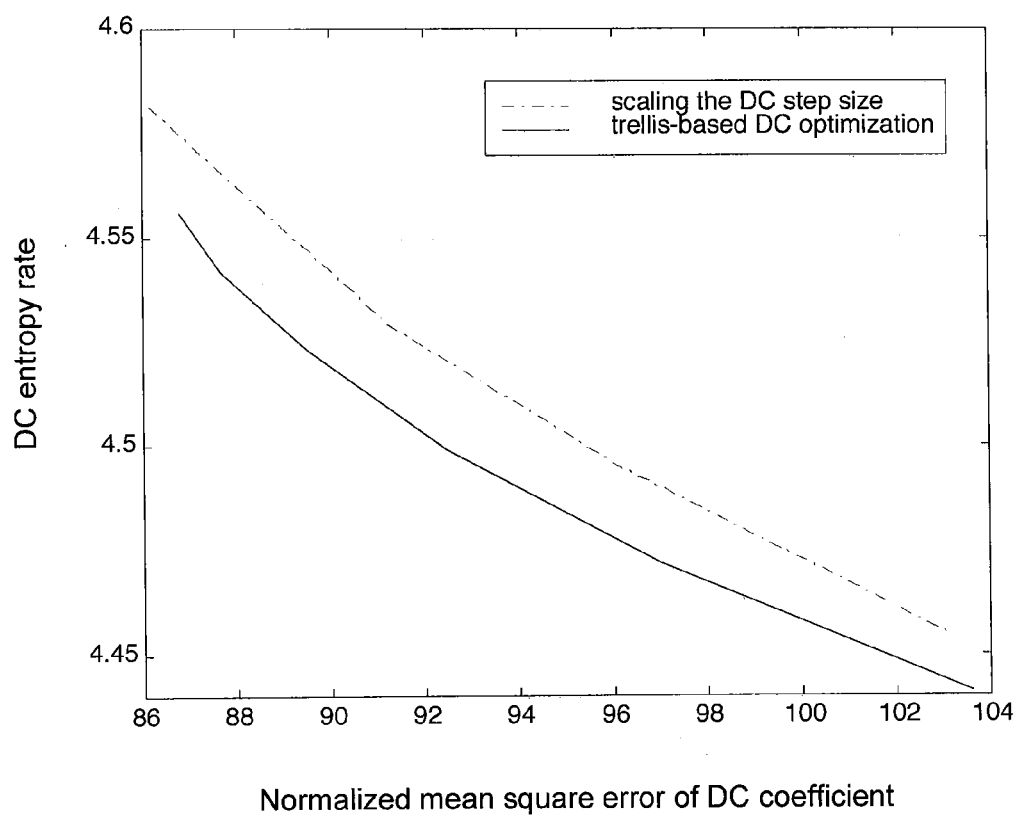
FIG. 18 plots the DC entropy rate vs. the DC distortion resulting from trellis-based DC optimization for a 512×512 Lena image in accordance with an aspect of the invention.

The quantized DC coefficients are not optimized in previous experiments. Unlike AC coefficients, the DC coefficients are usually very large and the difference only has 12 size groups for Huffman coding in JPEG syntax (contrary to 162 different run-size pairs for AC coefficients). Consequently, the gain from the trellis-based DC optimization is limited. When the gain from DC optimization is averaged to the bit rate, the overall improvement on PSNR is negligible. To illustrate the performance improvement resulting from the trellis-based DC optimization outlined in Section V, FIG. 18 plots the DC entropy vs. DC distortion for 512×512 Lena image. From these plots, we can clearly see the improvement of the trellis-based DC optimized algorithm over the scaled step size even though the gain is very limited.

Other variations and modifications of the invention are possible. All such modifications or variations are believed to be within the sphere and scope of the invention as defined by the claims appended hereto.

The invention claimed is:

1. A method of compressing a sequence of N coefficients, N being a positive integer, by determining a cost-determined sequence of N indices represented by a corresponding cost-determined sequence of differences under a given quantization step size and a given size distribution, wherein a sequence of differences defines a corresponding sequence of N indices such that each difference in the sequence of differences is a digital number equaling an $i_{th}$ index value minus an $(i-1)_{th}$ index value, i being greater than 0 and less than N−1, the method comprising the steps of:

(a) using the given quantization step size and the given size distribution to formulate a cost function for a plurality of possible sequences of differences, wherein for one possible sequence of differences the value of an index in the corresponding sequence of indices defined by the one possible sequence of differences is neither the value of the corresponding index resulting from quantizing the sequence of N coefficients using the given quantization step size nor the value of an immediately preceding index in the corresponding sequence of indices;

(b) applying the cost function to each possible sequence in the plurality of possible sequences of differences to determine an associated cost; and (c) selecting the corresponding cost-determined sequence of differences from the plurality of possible sequences of differences based on the associated cost, and determining the cost-determined sequence of N indices from the corresponding cost-determined sequence of differences.

2. The method as defined in claim 1 wherein step (b) comprises, for each possible sequence in the plurality of possible differences:

determining a corresponding sequence of N indices;
determining a corresponding sequence of N quantized coefficients using the given quantization step size and the corresponding sequence of N indices;
determining a distortion between the sequence of N coefficients and the corresponding sequence of N quantized coefficients;
determining a total compression rate resulting from using the given size distribution to encode the sequence of possible differences; and
determining the associated cost as a function of the distortion and the total compression rate.

3. The method according to claim 1 wherein
each index in the N indices is selected from a set of M possible indices;
step (b) comprises:
providing a sequence of N stages in one-to-one relation with the sequence of N coefficients, wherein N is an integer greater than 2 and the sequence of N stages are ordered from a zero stage to an $(N-1)_{th}$ stage such that (i) the zero stage is adjacent to a first stage, (ii) the $(N-1)_{th}$ stage is adjacent to $(N-2)_{th}$ stage, (iii) each $i_{th}$ stage, i being an integer between 1 and N−2 inclusive, is adjacent to an $(i-1)_{th}$ stage and an $(i+1)_{th}$ stage;
providing a plurality of nodes in each stage in the sequence of N stages, wherein each node in each stage represents a possible index in the set of M possible indices for encoding an associated coefficient in the sequence of N coefficients;
providing an initial stage preceding the zero node, wherein the initial stage comprises a single node;
providing a plurality of connections for connecting each pair of nodes in adjacent stages;
determining the associated cost as an associated incremental cost for each connection in the plurality of connections; and
step (c) further comprises
determining the associated cost as a least-cost sequence of connections in the plurality of connections, wherein the least-cost sequence of connections extends from the initial stage through each stage in the sequence of N stages; and
determining the cost-determined sequence of N indices from the least-cost sequence of connections.

4. The method as defined in claim 3, wherein step (c) further comprises using dynamic programming to find the least cost sequence of connections in the plurality of connections.

5. The method as defined in claim 3 wherein the method further comprises, for each stage in the sequence of N stages,
determining a hard-decision index using a hard-decision quantizer defined by the given quantization table to quantize the corresponding coefficient in the sequence of N coefficients; and,
selecting each node to represent a selected possible index within a selected difference of the hard-decision index such that the stage is a reduced stage having fewer than M nodes.

6. The method as defined in claim 5, wherein step (c) further comprises using dynamic programming to find the least cost sequence of connections in the plurality of connections.

7. The method as defined in claim 1, wherein the sequence of N coefficients are one of DC coefficients and quantized DC coefficients derived from an image in JPEG and MPEG.

8. A data processing system for compressing a sequence of N coefficients, N being a positive integer, by determining a cost-determined sequence of N indices represented by a corresponding cost-determined sequence of differences under a given quantization step size and a given size distribution, wherein a sequence of differences defines a corresponding sequence of N indices such that each difference in the sequence of differences is a digital number equaling an $i_{th}$ index value minus an $(i-1)_{th}$ index value, i being greater than 0 and less than N−1, the data processing system comprising a memory configured to store programs; a microprocessor configured to execute the stored programs to:

(a) use the given quantization step size and the given size distribution to formulate a cost function for a plurality of possible sequences of differences, wherein for one possible sequence of differences the value of an index in the corresponding sequence of indices defined by the one possible sequence of differences is neither the value of the corresponding index resulting from quantizing the sequence of N coefficients using the given quantization step size nor the value of an immediately preceding index in the corresponding sequence of indices; and,
(b) apply the cost function to each possible sequence in the plurality of possible sequences of differences to determine an associated cost; and selecting the corresponding cost-determined sequence of differences from the plurality of possible sequences of differences based on the associated cost, and determining the cost-determined sequence of N indices from the corresponding cost-determined sequence of differences.

9. The data processing system as defined in claim 8 wherein the microprocessor is operable to, for each possible sequence in the plurality of possible differences:
determine a corresponding sequence of N indices;
determine a corresponding sequence of N quantized coefficients using the given quantization step size and the corresponding sequence of N indices;
determine a distortion between the sequence of N coefficients and the corresponding sequence of N quantized coefficients;
determine a total compression rate resulting from using the given size distribution to encode the sequence of possible differences; and
determine the associated cost as a function of the distortion and the total compression rate.

10. The data processing system according to claim 8 wherein
each index in the N indices is selected from a set of M possible indices;
the microprocessor is operable to
provide a sequence of N stages in one-to-one relation with the sequence of N coefficients, wherein N is an integer greater than 2 and the sequence of N stages are ordered from a zero stage to an $(N-1)_{th}$ stage such that (i) the zero stage is adjacent to a first stage, (ii) the $(N-1)_{th}$ stage is adjacent to $(N-2)_{th}$ stage, (iii) each $i_{th}$ stage, i being an integer between 1 and N−2 inclusive, is adjacent to an $(i-1)_{th}$ stage and an $(i+1)_{th}$ stage;
provide a plurality of nodes in each stage in the sequence of N stages, wherein each node in each stage represents a possible index in the set of M possible indices for encoding an associated coefficient in the sequence of N coefficients;

provide an initial stage preceding the zero node, wherein the initial stage comprises a single node;

provide a plurality of connections for connecting each pair of nodes in adjacent stages;

determine the associated cost as an associated incremental cost for each connection in the plurality of connections;

determine the associated cost as a least-cost sequence of connections in the plurality of connections, wherein the least-cost sequence of connections extends from the initial stage through each stage in the sequence of N stages; and determine the cost-determined sequence of N indices from the least-cost sequence of connections.

11. The data processing system as defined in claim 10, wherein the microprocessor is operable to, use dynamic programming to find the least cost sequence of connections in the plurality of connections.

12. The data processing system as defined in claim 10 wherein the microprocessor is further operable to, for each stage in the sequence of N stages, determine a hard-decision index using a hard-decision quantizer defined by the given quantization table to quantize the corresponding coefficient in the sequence of N coefficients; and, select each node to represent a selected possible index within a selected difference of the hard-decision index such that the stage is a reduced stage having fewer than M nodes.

13. The data processing system as defined in claim 12, wherein the microprocessor uses dynamic programming to find the least cost sequence of connections in the plurality of connections.

14. The data processing system as defined in claim 8, wherein the sequence of N coefficients are one of DC coefficients and quantized DC coefficients derived from an image in JPEG and MPEG.

15. A computer program product for use on a computer system to compress a sequence of N coefficients, N being a positive integer, by determining a cost-determined sequence of N indices represented by a corresponding cost-determined sequence of differences under a given quantization step size and a given size distribution, wherein a sequence of differences defines a corresponding sequence of N indices such that each difference in the sequence of differences is a digital number equaling an $i_{th}$ index value minus an $(i-1)_{th}$ index value, i being greater than 0 and less than N−1, the computer program product comprising a non-transitory computer-readable medium, and means recorded on the medium to instruct the computer system to perform the steps of:

(a) using the given quantization step size and the given size distribution to formulate a cost function for a plurality of possible sequences of differences, wherein for one possible sequence of differences the value of an index in the corresponding sequence of indices defined by the one possible sequence of differences is neither the value of the corresponding index resulting from quantizing the sequence of N coefficients using the given quantization step size nor the value of an immediately preceding index in the corresponding sequence of indices;

(b) applying the cost function to each possible sequence in the plurality of possible sequences of differences to determine an associated cost; and (c) selecting the corresponding cost-determined sequence of differences from the plurality of possible sequences of differences based on the associated cost, and determining the cost-determined sequence of N indices from the corresponding cost-determined sequence of differences.

16. The computer program product as defined in claim 15 wherein step (b) comprises, for each possible sequence in the plurality of possible differences:

determining a corresponding sequence of N indices;

determining a corresponding sequence of N quantized coefficients using the given quantization step size and the corresponding sequence of N indices;

determining a distortion between the sequence of N coefficients and the corresponding sequence of N quantized coefficients;

determining a total compression rate resulting from using the given size distribution to encode the sequence of possible differences; and determining the associated cost as a function of the distortion and the total compression rate.

17. The computer program product according to claim 15 wherein each index in the N indices is selected from a set of M possible indices;

step (b) comprises:

providing a sequence of N stages in one-to-one relation with the sequence of N coefficients, wherein N is an integer greater than 2 and the sequence of N stages are ordered from a zero stage to an $(N-1)_{th}$ stage such that (i) the zero stage is adjacent to a first stage, (ii) the $(N-1)_{th}$ stage is adjacent to $(N-2)_{th}$ stage, (iii) each $i_{th}$ stage, i being an integer between 1 and N−2 inclusive, is adjacent to an $(i-1)_{th}$ stage and an $(i+1)_{th}$ stage;

providing a plurality of nodes in each stage in the sequence of N stages, wherein each node in each stage represents a possible index in the set of M possible indices for encoding an associated coefficient in the sequence of N coefficients;

providing an initial stage preceding the zero node, wherein the initial stage comprises a single node;

providing a plurality of connections for connecting each pair of nodes in adjacent stages;

determining the associated cost as an associated incremental cost for each connection in the plurality of connections; and step (c) further comprises determining the associated cost as a least-cost sequence of connections in the plurality of connections, wherein the least-cost sequence of connections extends from the initial stage through each stage in the sequence of N stages; and determining the cost-determined sequence of N indices from the least-cost sequence of connections.

18. The computer program product as defined in claim 17, wherein step (c) further comprises using dynamic programming to find the least cost sequence of connections in the plurality of connections.

19. The computer program product as defined in claim 17 wherein the computer program product further comprises, for each stage in the sequence of N stages, determining a hard-decision index using a hard-decision quantizer defined by the given quantization table to quantize the corresponding coefficient in the sequence of N coefficients; and, selecting each node to represent a selected possible index within a selected difference of the hard-decision index such that the stage is a reduced stage having fewer than M nodes.

20. The computer program product as defined in claim 19, wherein step (c) further comprises using dynamic programming to find the least cost sequence of connections in the plurality of connections.

21. The computer program product as defined in claim 15, wherein the sequence of N coefficients are one of DC coefficients and quantized DC coefficients derived from an image in JPEG and MPEG.

\* \* \* \* \*